US011165086B2

(12) United States Patent
Modderno et al.

(10) Patent No.: US 11,165,086 B2
(45) Date of Patent: Nov. 2, 2021

(54) MODULAR AND SCALABLE FLOW BATTERY SYSTEM

(71) Applicant: Largo Clean Energy Corp., Andover, MA (US)

(72) Inventors: Jeffrey Modderno, Andover, MA (US); Peter Gottleib, Wayland, MA (US); Michael Falcinelli, Boxford, MA (US); Shazad Butt, Natick, MA (US)

(73) Assignee: LARGO CLEAN ENERGY CORP., Andover, MA (US)

( * ) Notice: Subject to any disclaimer, the term of this patent is extended or adjusted under 35 U.S.C. 154(b) by 313 days.

(21) Appl. No.: 15/845,849

(22) Filed: Dec. 18, 2017

(65) Prior Publication Data

US 2018/0175430 A1    Jun. 21, 2018

Related U.S. Application Data

(60) Provisional application No. 62/436,347, filed on Dec. 19, 2016, provisional application No. 62/463,388, (Continued)

(51) Int. Cl.
*H01M 8/249* (2016.01)
*H01M 8/04664* (2016.01)
(Continued)

(52) U.S. Cl.
CPC ....... *H01M 8/249* (2013.01); *H01M 8/04186* (2013.01); *H01M 8/04201* (2013.01); (Continued)

(58) Field of Classification Search
None
See application file for complete search history.

(56) References Cited

U.S. PATENT DOCUMENTS 8,709,629 B2 * 4/2014 Vincent ................. H01M 8/188
429/80
9,312,557 B2 4/2016 Zhang et al.
(Continued)

FOREIGN PATENT DOCUMENTS

CN    102290588 A    12/2011
CN    105242211 A    1/2016
(Continued)

OTHER PUBLICATIONS

Written Opinion of the International Searching Authority and International Search Report issued in corresponding International Application No. PCT/US17/67100, dated Mar. 7, 2018, 8 pages.
(Continued)

*Primary Examiner* — Jonathan Crepeau
(74) *Attorney, Agent, or Firm* — Cantor Colburn LLP

(57) ABSTRACT

A modular flow battery includes a battery stack container housing a plurality of redox flow battery stacks in fluid communication with at least one pair of electrolyte containers including an anolyte container for holding an anolyte and a catholyte container for holding a catholyte. Additional pairs of electrolyte containers can be connected to the battery stack container to increase an amount of energy that can be stored by the modular flow battery system. Respective housings enclosing each of the battery stack container and the electrolyte containers are configured for operation in a stacked configuration. In this manner, the energy storage capacity of the modular flow battery system can be further increased with substantially no increase in a lateral area occupied by the system.

22 Claims, 30 Drawing Sheets

Related U.S. Application Data filed on Dec. 19, 2016, provisional application No. 62/436,365, filed on Dec. 19, 2016.

(51) Int. Cl.
*H01M 8/18* (2006.01)
*H01M 8/04082* (2016.01)
*H01M 8/04186* (2016.01)

(52) U.S. Cl.
CPC ....... *H01M 8/04686* (2013.01); *H01M 8/188* (2013.01); *H01M 2250/10* (2013.01); *Y02B 90/10* (2013.01); *Y02E 60/50* (2013.01)

(56) References Cited

U.S. PATENT DOCUMENTS

| | | | |
|---|---|---|---|
| 10,608,274 B2 | 3/2020 | Mou et al. | |
| 2004/0169493 A1* | 9/2004 | Tsutsui | H01M 8/04186 320/128 |
| 2007/0172616 A1 | 7/2007 | Ehsani et al. | |
| 2008/0241643 A1* | 10/2008 | Lepp | H01M 8/04753 429/61 |
| 2011/0081562 A1 | 4/2011 | Parakulam et al. | |
| 2011/0244277 A1 | 10/2011 | Gordon, II et al. | |
| 2013/0011704 A1 | 1/2013 | Horne et al. | |
| 2013/0011711 A1* | 1/2013 | Peace | H01M 8/188 429/101 |
| 2014/0050947 A1 | 2/2014 | Donnelly | |
| 2014/0227628 A1 | 8/2014 | Tang et al. | |
| 2014/0255734 A1 | 9/2014 | Tennessen et al. | |
| 2015/0162635 A1 | 6/2015 | Parakulam et al. | |
| 2016/0006051 A1 | 1/2016 | Winter | |
| 2016/0204458 A1 | 7/2016 | Boersma et al. | |

FOREIGN PATENT DOCUMENTS

| | | |
|---|---|---|
| JP | 2012-160344 A | 8/2012 |
| JP | 2014-127263 A | 7/2014 |
| WO | 2016/007555 A1 | 1/2016 |

OTHER PUBLICATIONS

Written Opinion of the International Searching Authority and International Search Report issued in corresponding International Application No. PCT/US17/67093, dated Mar. 7, 2018, 8 pages.
Written Opinion of the International Searching Authority and International Search Report issued in corresponding International Application No. PCT/US17/67088, dated Mar. 6, 2018, 8 pages.
Russia Office Action for Russia Application No. 201921906/07; Application Filing Date: Dec. 18, 2017; dated Apr. 15, 2021, with English Translation, 11 pages.

\* cited by examiner

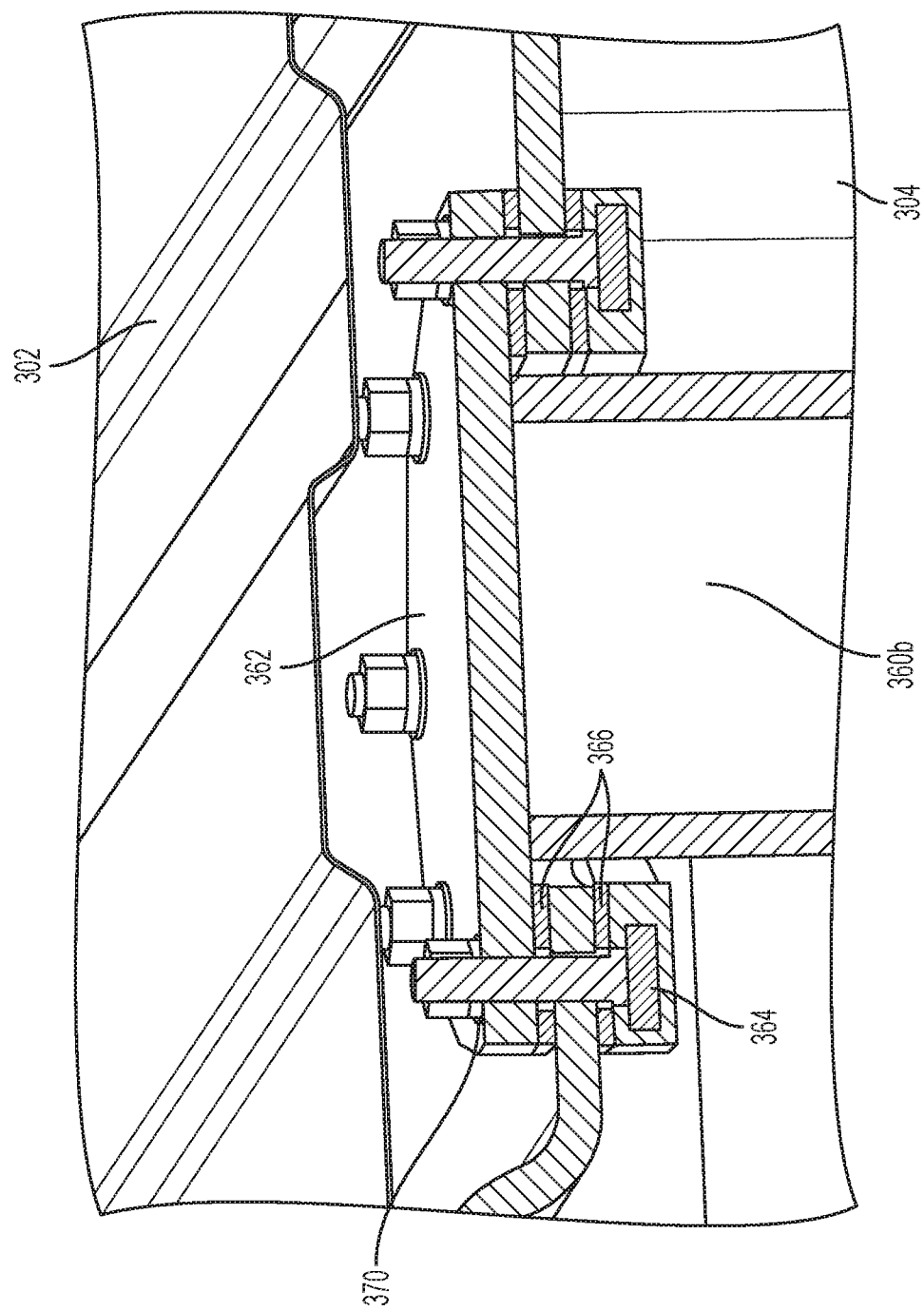

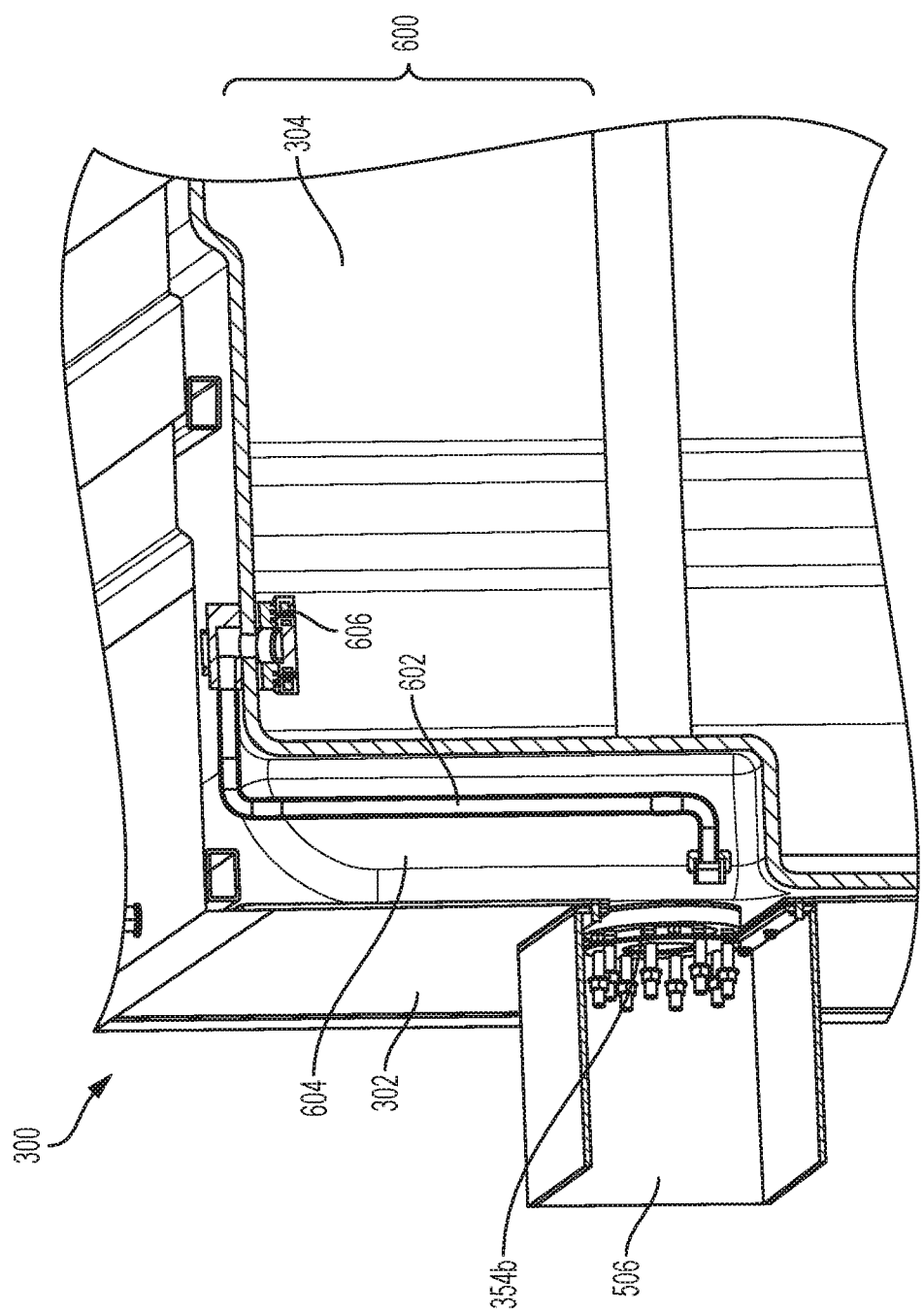

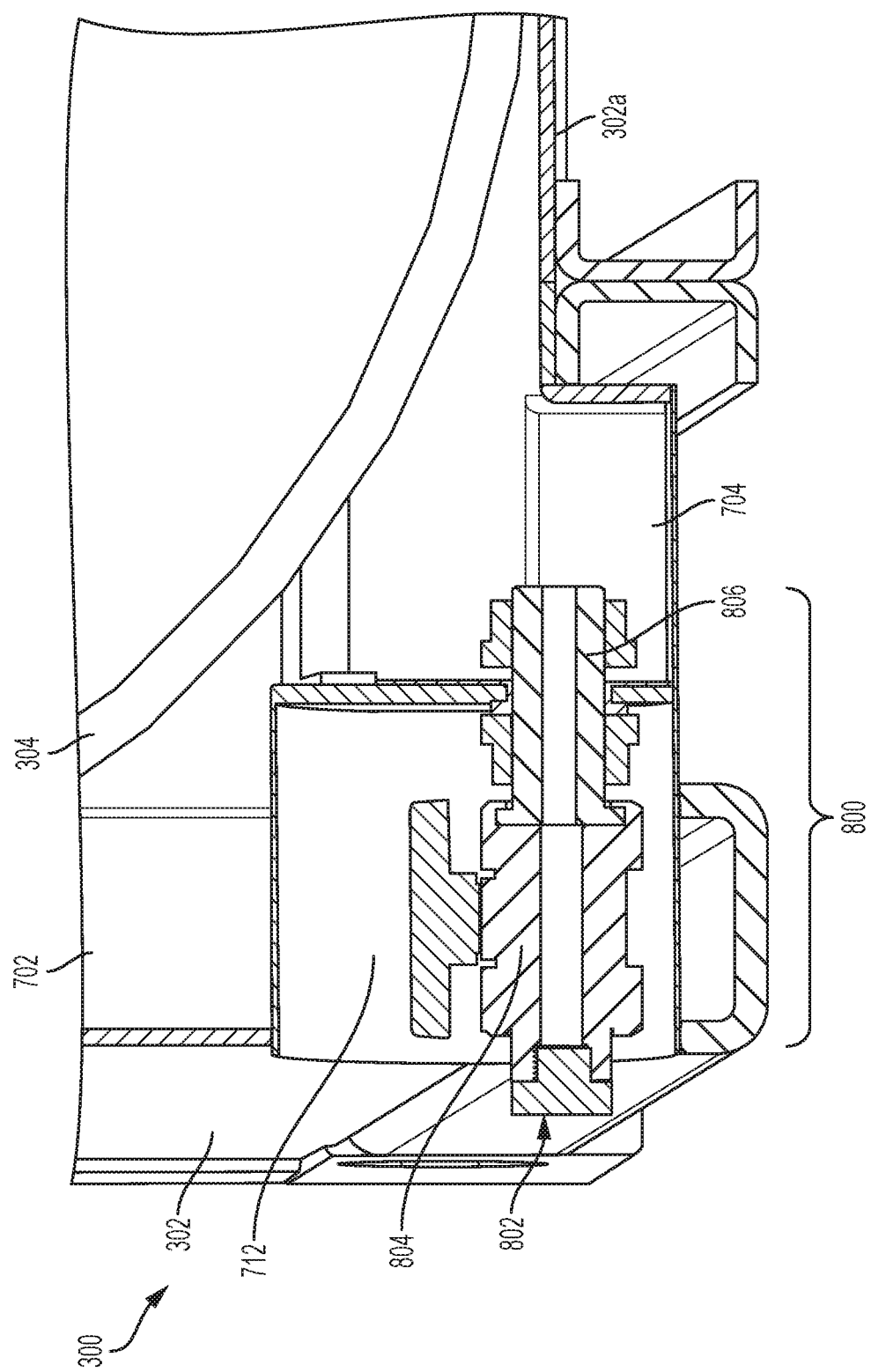

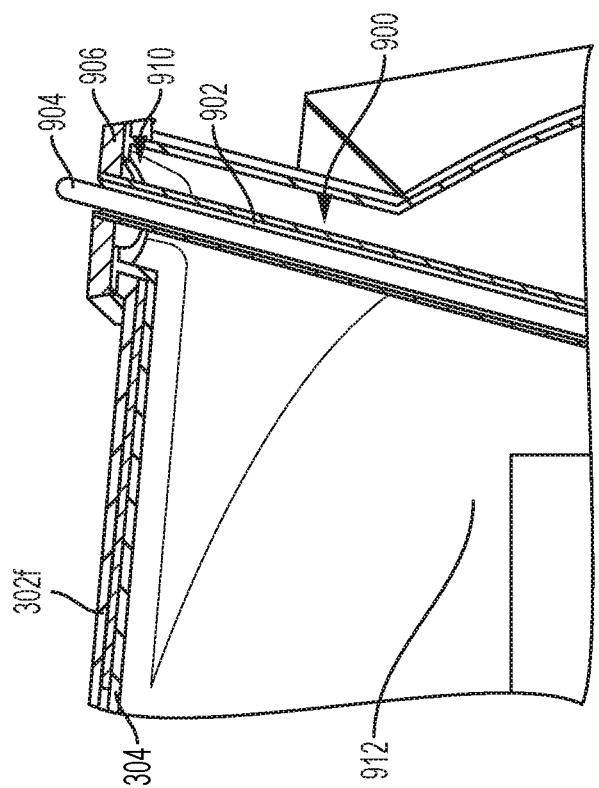
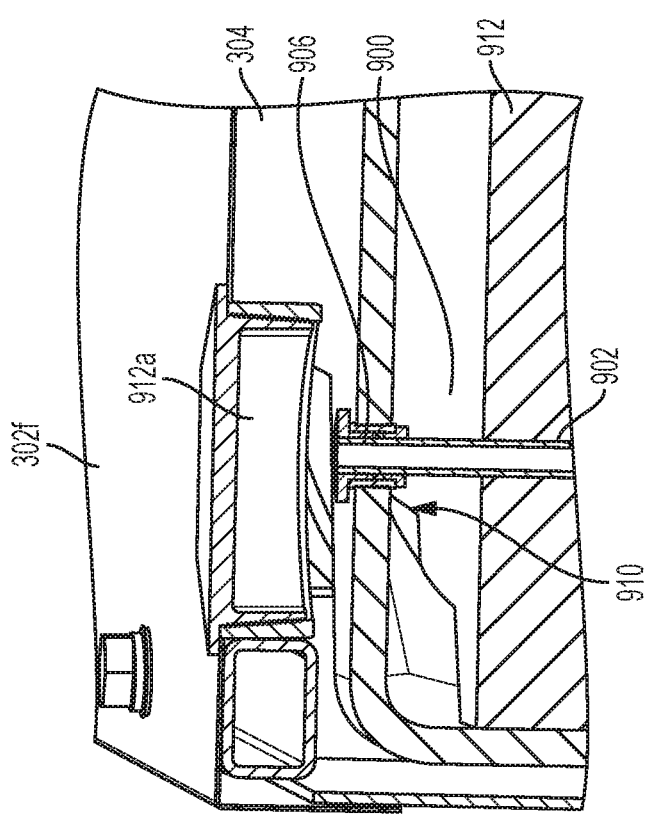

MODULAR AND SCALABLE FLOW BATTERY SYSTEM

CROSS REFERENCE TO RELATED APPLICATIONS

This application claims the benefit of U.S. Provisional Application No. 62/436,347, filed on Dec. 19, 2016, and entitled "Modular and Scalable Flow Battery System" and U.S. Provisional Patent Application No. 62/436,388, filed on Dec. 19, 2016, and entitled "Systems and Methods for Electrolyte Storage and Detecting Faults in Flow Batteries" and U.S. Provisional Patent Application No. 62/436,365, filed on Dec. 19, 2016, and entitled "Large Scale Flow Battery System." This application is also related to U.S. patent application Ser. No. 15/846,009, filed Dec. 18, 2017, entitled "Systems and Methods For Electrolyte Storage and Detecting Faults In Flow Batteries" and U.S. patent application Ser. No. 15/845,896, filed Dec. 18, 2017, entitled "Modular and Scalable Flow Battery System". The entirety of each of these applications is incorporated by reference.

FIELD

A flow battery is provided and, in particular, a large-scale, modular and scalable flow battery.

BACKGROUND

Demand for large-scale energy storage solutions is increasing. For example, as more renewable energy sources (e.g., solar, wind, etc.) are added to the electrical grid, the task of balancing power supply with demand can become difficult given the intermittent, and often unpredictable, power output of renewables. This short-term intermittency can be effectively addressed by use of energy storage systems capable of large-scale energy storage in excess of demand and release of the stored energy when there is greater demand.

However, not every energy storage system is suitable for deployment at large-scale. Notably, cost, reliability, safety, and regulation are each significant factors that affect the suitability of an energy storage system for a particular application.

Flow batteries, also known as redox flow batteries or redox flow cells, can be used for large-scale energy storage. Flow batteries can be configured to convert electrical energy into chemical energy that can be stored and later released when there is demand. Flow batteries can use externally supplied, fluid electrolyte solutions that include reactants that participate in reversible electrochemical reactions. Upon charging, the electrical energy supplied can cause a chemical reduction reaction in one electrolyte and an oxidation reaction in the other electrolyte. Upon discharge, the chemical energy contained in the liquid electrolytes can be released in the reverse reactions and electrical energy can be drawn from the electrodes. The flow batteries can be used in grid-connected energy storage systems and/or in off-grid energy storage systems.

SUMMARY

Various methods and devices are provided that include a modular and scalable flow battery system including a battery stack container that houses a plurality of redox flow battery stacks capable of fluid communication with at least one pair of electrolyte containers including an anolyte container for holding an anolyte and a catholyte container for holding a catholyte. The battery stack container is configured such that additional pairs of electrolyte containers can be connected to the battery stack container to increase an amount of energy that can be stored by the modular flow battery system. In further embodiments, respective housings enclosing each of the battery stack container and the electrolyte containers are configured for operation in a stacked configuration. In this manner, the power and energy storage capacity of the modular flow battery system can be increased as desired with substantially no increase in a lateral area occupied by the system.

In an embodiment, a modular secondary battery is provided. The modular secondary battery includes a battery stack container and at least one pair of electrolyte containers. The battery stack container includes a housing, an anolyte conduit network, and a catholyte conduit network. The housing includes a plurality of flow cell batteries in electrical communication. The anolyte conduit network can be in fluid communication with each of the plurality of flow cell batteries and includes at least one pair of anolyte return and anolyte supply conduits. The catholyte conduit network can be in fluid communication with each of the plurality of flow cell batteries and includes at least one pair of catholyte return conduits and catholyte supply conduits. The at least one pair of electrolyte containers can include containers including an anolyte container configured to contain an anolyte solution and a catholyte container configured to contain a catholyte solution. Each anolyte container can be configured to reversibly couple with an anolyte return and anolyte supply conduit pair and each catholyte container can be configured to reversibly couple with a catholyte return and catholyte supply conduit pair to thereby vary an amount of anolyte solution and catholyte solution and a capacity of electrical energy that can be stored and discharged.

In an embodiment, each battery stack container can be configured to be vertically stacked with respect to another battery stack container and each electrolyte container can be configured to be vertically stacked with respect to another tank container.

In an embodiment, the modular secondary battery can include at least two vertically stacked battery stack containers, at least two vertically stacked anolyte containers, and at least two vertically stacked catholyte containers.

In an embodiment, the at least one pair of electrolyte containers can include at least two pairs of electrolyte containers.

In an embodiment, the catholyte conduit can be different from the anolyte conduit network.

In an embodiment, the battery stack container can be generally elongated and extend along a longitudinal axis and wherein respective anolyte container and catholyte containers are coupleable to the battery stack container along sides lateral to the longitudinal axis.

In an embodiment, each of the at least one pair of anolyte return conduits and anolyte supply conduits can be positioned on a first lateral side of the container stack and each of the at least one pair of catholyte return conduits and catholyte supply conduits can be positioned on a second lateral side of the container stack that opposes the first lateral side of the container stack.

In another embodiment, a method for providing variable energy storage and power output is disclosed. The method can include selecting at least one pair of electrolyte containers to provide a predetermined capacity of electrical energy, where each pair of electrolyte containers can include an anolyte container configured to hold an anolyte solution and a catholyte container configured to hold a catholyte solution. The method can also include selecting a number of flow cell batteries in at least one battery stack container to provide a predetermined amount of power. The method can additionally include coupling the at least one selected pair of electrolyte containers with a battery stack container including the selected number of flow cell batteries to create a flow battery system including the predetermined capacity of electrical energy and the predetermined amount of power.

In an embodiment, each anolyte container can be configured to reversibly couple with an anolyte return and anolyte supply conduit pair, and each catholyte container can be configured to reversibly couple with a catholyte return and catholyte supply conduit pair.

In an embodiment, the at least one pair of electrolyte containers comprises two pairs of electrolyte containers.

In an embodiment, the at least one selected pair of electrolyte containers can be coupled to the battery stack container such that the anolyte container is coupled on one side of the battery stack container and the catholyte container is coupled on another, opposed side of the battery stack container.

In an embodiment, the at least one pair of electrolyte containers can include at least two pairs of electrolyte containers, and at least one battery stack container can include at least two battery stack containers.

In an embodiment, the at least two pairs of electrolyte containers and the at least one battery stack container can be arranged such that anolyte containers are vertically stacked and catholyte containers are vertically stacked, and wherein the battery stack containers are vertically stacked. In an embodiment, a method for providing variable energy storage and power output is provided. The method can include selecting at least one pair of electrolyte containers to provide a predetermined capacity of electrical energy, each pair of electrolyte containers including an anolyte container configured to hold an anolyte solution and a catholyte container configured to hold a catholyte solution. The method can also include selecting a number of flow cell batteries (e.g., redox flow cell batteries) in at least one battery stack container to provide a predetermined amount of power. The method can additionally include coupling the at least one selected pair of electrolyte containers with a battery stack container including the selected number of flow cell batteries to create a flow battery system including the predetermined capacity of electrical energy and the predetermined amount of power.

In another embodiment, a method for providing variable energy storage and power output is disclosed. The method can include providing at least one battery stack container including a plurality of flow cell batteries in electrical communication. The method can also include providing an anolyte conduit network in fluid communication with the plurality of flow cell batteries and at least one pair of anolyte return conduits and anolyte supply conduits. The method can additionally include providing a catholyte conduit network in fluid communication with the plurality of flow cell batteries and at least one pair of catholyte return conduits and catholyte supply conduits. The method can further include selecting at least one pair of electrolyte containers. Each pair of electrolyte containers can include an anolyte container configured to contain an anolyte solution and a catholyte container configured to contain a catholyte solution. Each anolyte container can be configured to reversibly couple with an anolyte return and anolyte supply conduit pair and each catholyte container can be configured to reversibly couple with a catholyte return and catholyte supply conduit pair. The number of electrolyte containers can be selected to vary an amount of anolyte solution and catholyte solution in fluid communication with the battery stack container and thereby provide a desired capacity of electrical energy that can be stored and discharged.

In an embodiment, each battery stack container can be configured to be vertically stacked with respect to another battery stack container and each electrolyte container can be configured to be vertically stacked with respect to another electrolyte container.

In an embodiment of the method, the at least one battery stack container can include at least two vertically stacked battery stack containers and the at least one pair of electrolyte containers can include at least two vertically stacked anolyte containers and at least two vertically stacked catholyte containers.

In an embodiment, the battery stack container is generally elongated and has a longitudinal axis, and where respective anolyte container and catholyte containers can be configured to couple to the battery stack container along sides lateral to the longitudinal axis.

In an embodiment, each of the at least one pair of anolyte return conduits and anolyte supply conduits can be positioned on a first lateral side of the container stack and each of the at least one pair of catholyte return conduits and catholyte supply conduits can be positioned on a second lateral side of the container stack that opposes the first lateral side of the container stack.

In an embodiment, the method can further include detecting a leak in at least one of the pair of electrolyte containers using a leak sensor system within the electrolyte container. The leak sensor system can be disposed between a container wall and a tank configured to contain an electrolyte, and the leak sensor system can include a sump, a sensor configured to detect an electrolyte, and a fitting configured to provide fluid communication between the sump and the sensor.

In an embodiment, the method can also include filling an interstitial space between the container wall and the tank with a low conductivity liquid, where the low conductivity liquid is miscible with an electrolyte that leaks from the tank to form an electrolyte mixture, the low conductivity liquid provided in a sufficient volume such that the electrolyte mixture fills the sump and contacts the sensor. The method can additionally include detecting the electrolyte leak based upon a conductivity of the electrolyte mixture in contact with the sensor.

BRIEF DESCRIPTION OF THE DRAWINGS

The present disclosure will be more fully understood from the following detailed description taken in conjunction with the accompanying drawings, in which:

FIGS. 4A-4B are cross-sectional views of the electrolyte container of FIG. 3A illustrating an embodiment of pipe supports for a return pipe;

FIGS. 6A-6B are a cross-sectional view of the tank container of FIG. 3A illustrating a nitrogen delivery system; (A) overall view; (B) nozzle detail;

FIG. 8 is a cross-sectional view of the electrolyte container of FIG. 3A illustrating an embodiment of an electrolyte drain;

FIGS. 9A-9C are cross-sectional views of the tank container of FIG. 3A illustrating an embodiment of a electrolyte tank level sensor configured for use with stacked tank container configurations;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features. Thus, within a particular embodiment, each feature of each like-named component may not necessarily be fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, system and methods are provided for energy storage.

A flow battery can include a redox flow cell that has a negative electrode and a positive electrode separated by a separator, such as an ion-exchange membrane. A negative fluid electrolyte (sometimes referred to as the anolyte) can be delivered to the negative electrode and a positive fluid electrolyte (sometimes referred to as the catholyte) can be delivered to the positive electrode. The anolyte and catholyte can be configured to drive electrochemically reversible redox reactions. The separator can be configured to prevent the electrolytes from freely and rapidly mixing but it can also be configured to permit selected ions to pass through to complete the redox reactions.

Overview of Redox Flow Batteries

Figure 1A:
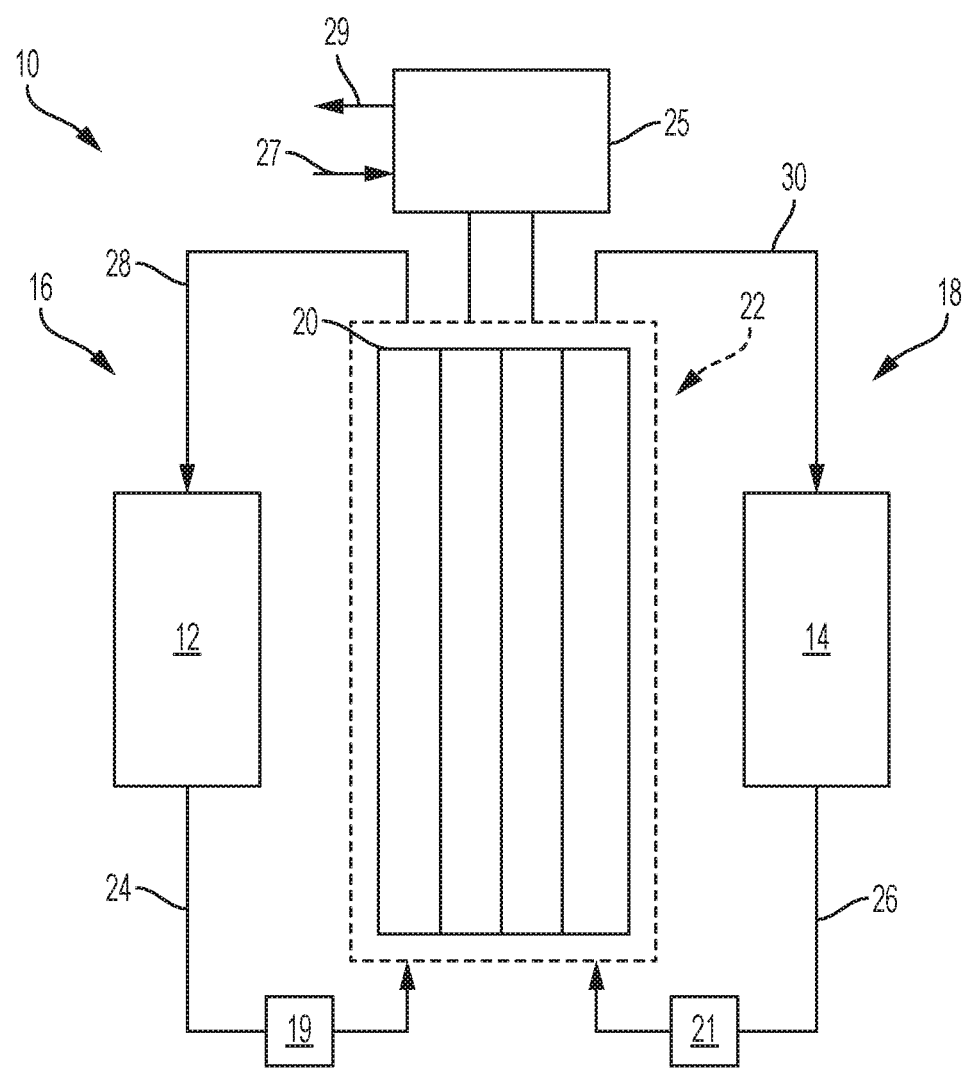
FIG. 1A is a schematic diagram illustrating an embodiment of a flow battery system.

Referring to FIG. 1, is a schematic diagram illustrating an embodiment of a redox flow battery system 10. The flow battery system 10 can include a first electrolyte storage tank 12, a second electrolyte storage tank 14, a first electrolyte circuit loop 16, a second electrolyte circuit loop 18, a first flow regulator 19, a second flow regulator 21, one or more flow battery cells 20 arranged in a stack 22, a power converter 25, a controller (not shown), energy input 27, and energy output 29. The first and second electrolyte storage tanks 12 and 14 can each be adapted to hold and store one of a pair of electrolyte solutions. Examples of suitable electrolyte solution pairs can be based on vanadium, bromine, iron, chromium, zinc, cerium, lead, sulfur, or any suitable combination thereof.

During operation of the flow battery system 10, the liquid electrolytes containing redox active species can be circulated through one or more flow battery cells 20 of the stack 22 to convert chemical energy to electrical energy for power generation. A person skilled in the art will appreciate that the redox reactions can be reversible to convert electrical energy to chemical energy for energy storage. For example, the first and second electrolyte circuit loops 16 and 18 can each include a respective source conduit 24, 26, and a return conduit 28, 30. The first and second flow regulators 19 and 21 can each be adapted to selectively regulate flow of one of the electrolyte solutions through a respective one of the electrolyte circuit loops 16, 18 in response to control signals from the controller. Each of the flow regulators 19, 21 can include a single device, such as a variable speed pump or an electronically actuated valve, or a plurality of such devices, depending upon the particular design requirements of the flow battery system 10. Embodiments of the present disclosure, however, are not limited to any particular type of flow regulator.

Figure 1B:
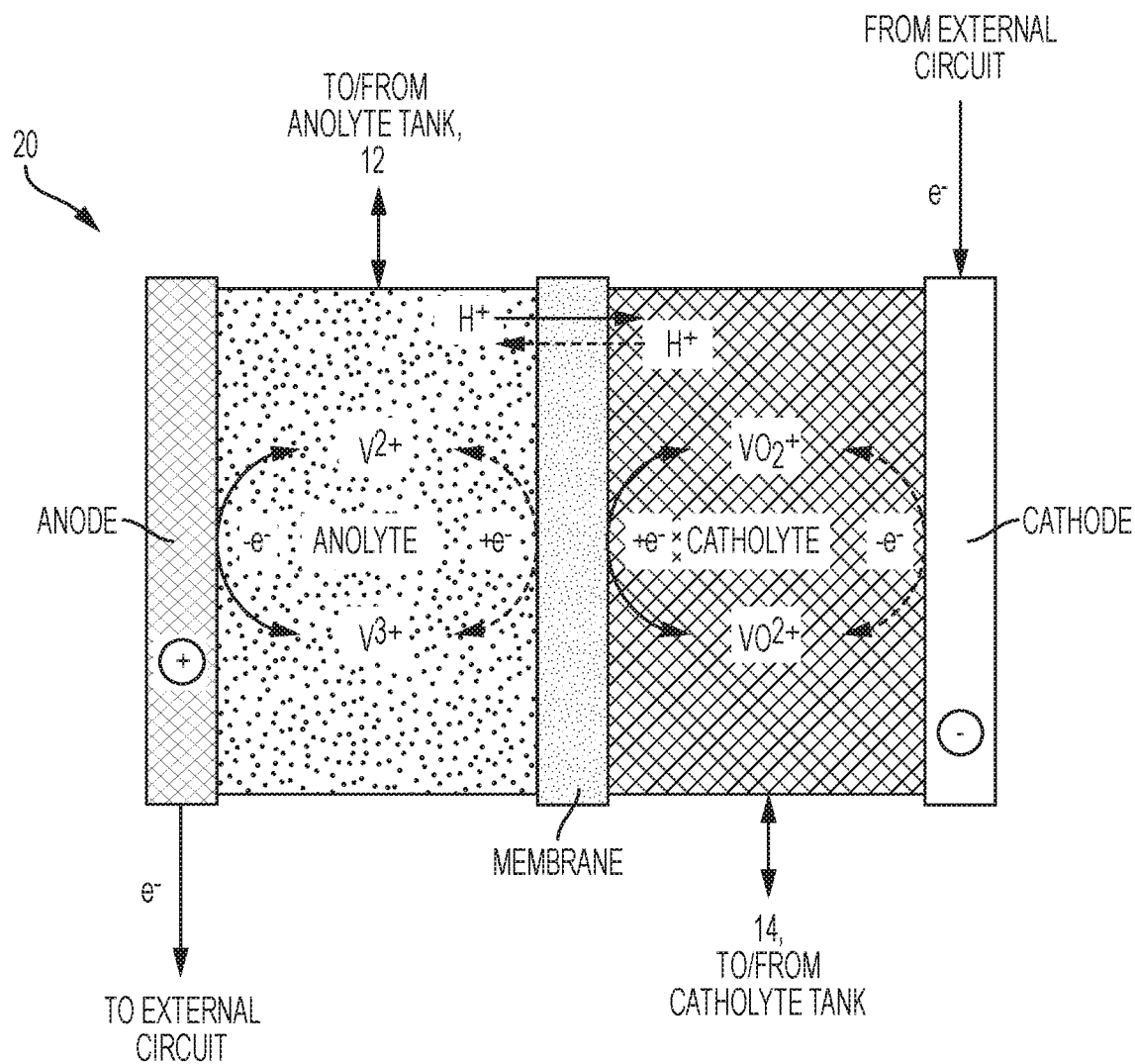
FIG. 1B is a schematic diagram illustrating an embodiment of an electrochemical cell of a battery cell stack of the flow battery of FIG. 1A.

FIG. 1B is a diagram illustrating one exemplary embodiment of a battery cell 20 of the stack 22 and representative redox reactions that can convert chemical energy of the liquid electrolytes into electrical energy. The battery cell 20 can include a porous, negative electrode (anode) 50, a porous positive electrode (cathode) 52, and a separator or membrane 54 interposed there between. The porous negative electrode 50 can be in fluid communication with the liquid electrolyte of the storage tank 12, referred to as an anolyte, and the porous positive electrode 52 can be in fluid communication with the liquid electrolyte of the storage tank 14, referred to as a catholyte. The positive and negative electrodes are further in electrical communication with an external circuit.

In some implementations, the cell 20 can form a portion of a vanadium-vanadium (e.g., all-vanadium) redox flow battery. The liquid electrolyte for vanadium redox flow batteries can be vanadium sulfate dissolved in sulfuric acid. Concentrations of vanadium sulfate and sulfuric acid can be selected from the range of about 1-2M to about 4-5M, respectively. Redox couples for an all-vanadium system are presented below in Equations 1 and 2. The sulfate spectator species (SO$_4$) is not shown for clarity.

$$\text{Anolyte (-): } V^{+2} \leftrightarrow V^{+3} e^-, U°=-0.25V \tag{1}$$

$$\text{Catholyte (+): } VO_2^+ + 2H^+ + e^- \leftrightarrow VO^{2+} + H_2O, U°=1.00V \tag{2}$$

Negative and positive half-cell reactions can each occur at the surface of the anode 50 and cathode 52, which can be formed from a carbon-based paper and they can be separated by separator 54 which can take the form of a PFSA (perfluorinated sulfonic acid)-based proton exchange membrane. The separator 52 can allow protons to transfer charge between cells 20 while minimizing crossover of vanadium. In the stack 22, the cells 20 can be electrically connected in series through graphite bipolar plates (not shown) which can also contain flow channels for bulk electrolyte transport to and from each of the cells 20. The cells 20 can be fed electrolyte in parallel through a common manifold integrated into the cell stack 22.

The flow battery system 10 can operate in three modes: charge, discharge, and electrolyte maintenance. During charge and discharge operations, energy can be supplied or extracted from the electrolyte by pumping reactants from the storage tanks 12, 14 to the cell stack 22 in sufficient quantities to support the electrochemistry.

During electrolyte maintenance, at least a portion of the effects of vanadium crossover through the separator 54 can be reversed. As an example, the concentration of vanadium in the catholyte can increase over time (i.e. with increasing number of charge/discharge cycles). Net water transport across the separator 54 can also result in changes in vanadium concentration. Both of these processes can impact an overall volume of electrolyte in each of the tanks 12, 14. Without this maintenance, energy capacity and efficiency can decrease with cycling. Vanadium precipitation can also present a concern on the catholyte side of the cells 20 if the concentration of vanadium and/or temperature exceeds predetermined thresholds (e.g., concentration greater than or equal to about 2M, temperature greater than or equal to about 40° C.).

Embodiments of the systems and techniques discussed herein can employ all-vanadium redox flow batteries. However, other flow batteries can also be used. All-vanadium redox flow batteries can provide advantages over other types of redox flow batteries. As an example, other redox chemistries can exhibit incompatibility and/or sensitivity of, the two electrolyte streams to contamination from the other. If a species crosses over and reacts irreversibly with elements in the opposite stream, it can comprise efficiency loss on that particular charge/discharge cycle, as well as a loss of capacity and degradation in the overall performance of the flow battery system 10. As a result, expensive maintenance to separate the electrolytes and recover reactants can be required. In contrast, as all-vanadium systems employ vanadium in both the anolyte and catholyte, crossover can represent, at worst, only an efficiency loss as no species are irreversibly consumed or removed from their reactive electrolytic solution.

FIGS. 2A-2E illustrate embodiments of a modular and scalable flow battery system 200. As discussed in detail below, the system 200 can include a modular design that takes full advantage of the ability of flow batteries to separate power (provided by the stack) from energy (provided by the remotely stored electrolyte). Power of the system 200 can be determined by a number of battery cell stacks it contains, while energy stored by the system 200 can be determined by how much electrolyte is available for use by the battery cell stacks. The system 200 can also provide battery cell stacks and electrolyte storage in form factors that can be easy to transport, store, and deploy. As a result, embodiments of the disclosed modular flow battery system 200 can provide large-scale energy storage capacity that can be scaled in a rapid and cost-effective manner.

Figure 2A:
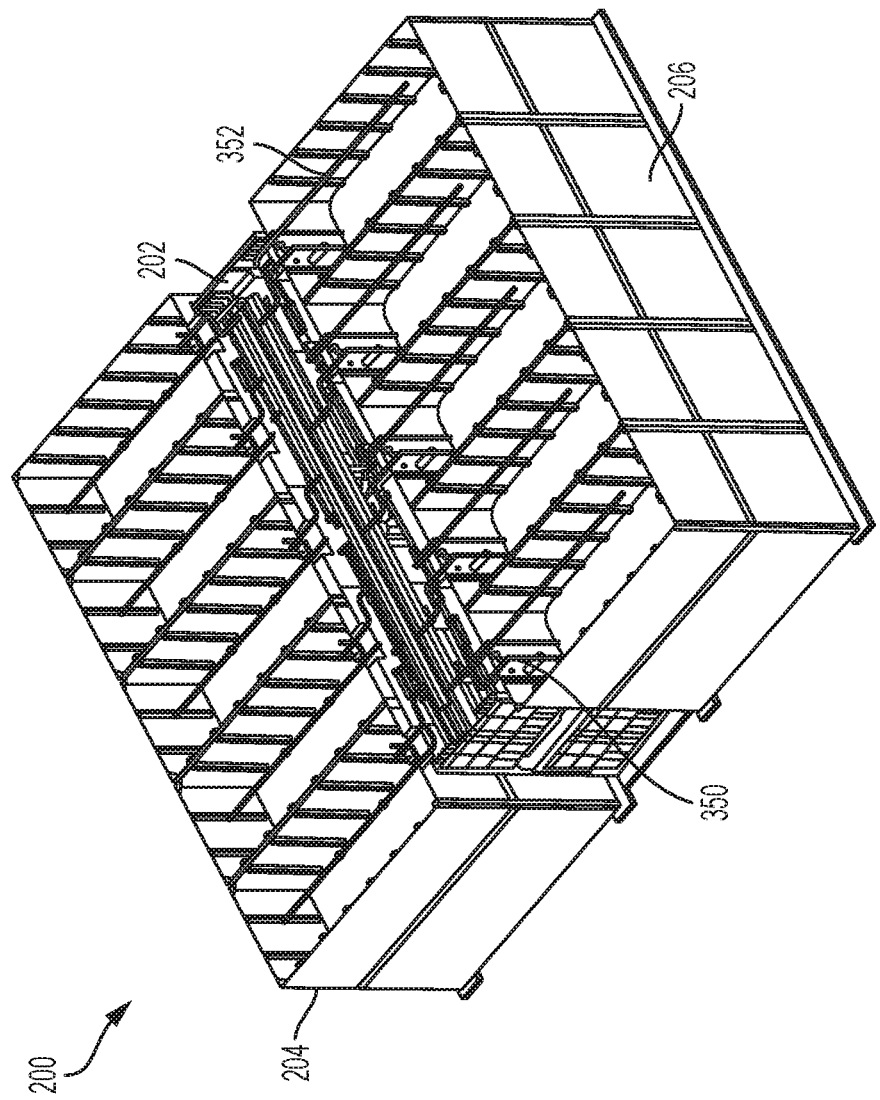
FIGS. 2A-2B are cutaway views of an embodiment of a modular flow battery system including a battery stack container in fluid communication with a plurality of electrolyte containers.
Figure 2B:
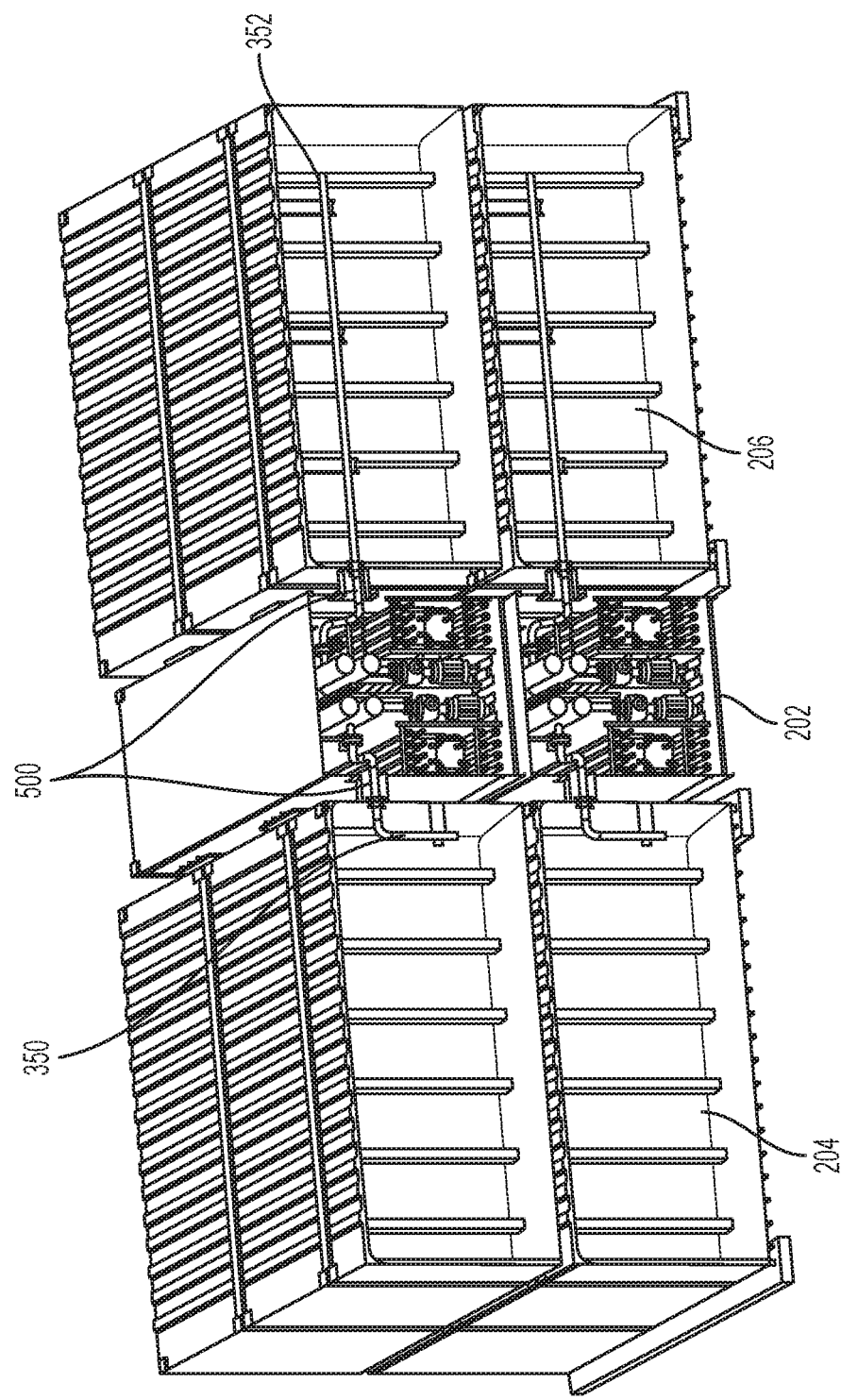

As illustrated in FIGS. 2A-2B, embodiments of the system 200 can include at least one battery stack 202, one or more anolyte storage 204, and one or more catholyte storage 206. As discussed in greater detail below, each battery stack 202 can be configured for fluid communication with a respective pair of anolyte and catholyte storage 204, 206. As an example, battery stacks 202 can be housed with any electrolyte pumps, supporting plumbing, valves, and control electronics necessary to transfer electrolytes between the battery stacks 202 and the anolyte and catholyte storage 204, 206. Thus, a variable number of pairs of anolyte and catholyte storage 204, 206 can be coupled to each battery stack 202.

In certain embodiments, the battery stack 202 can be configured to generate power using a different anolyte and catholyte. Therefore, the electrolytes stored in the anolyte storage and the catholyte storage can be different. In other embodiments (e.g., all-vanadium flow batteries), the battery stack 202 can be configured to generate power using the same electrolyte for the catholyte and electrolyte. Therefore, the liquid electrolyte stored in the anolyte and catholyte storage can be the same.

Each battery stack 202, anolyte storage 204, and catholyte storage 206 can have a form factor that provides ease of transport and deployment on site. As an example, each battery stack 202, anolyte storage 204, and catholyte storage 206 can be provided in respective containers having a form factor satisfying standard dimensions established by the International Organization for Standardization (ISO) for shipping containers. In certain embodiments, the battery stack 202 can adopt a first form factor and the anolyte and catholyte storage 204, 206 can be independently selected in different form factors. As an example, the battery stack 202 can be provided within ISO standard dimension 40 foot shipping containers, and the anolyte and catholyte storage 204, 206 can be provided within ISO standard dimension 20 foot shipping containers. While embodiments of the system 200 may be discussed in regards to specific dimensions of the battery stack 202 anolyte storage 204, and catholyte storage 206 may be discussed herein, further embodiments of the system can employ any ISO standard dimension shipping container sizes without limit. Accordingly, the battery stack 202, anolyte storage 204, and catholyte storage 206 can be interchangeably referred to as battery stack containers 202, anolyte storage containers 204, and catholyte storage containers 206 herein.

Beneficially, the container form factor can allow the power and energy storage capability of the system 200 to be rapidly scaled, which can be a significant consideration in the context of large-scale deployments. In one aspect, the standard dimensions of each of the battery stack containers 202 and the anolyte and catholyte storage containers 204, 206 can facilitate transportation from manufacturer to site by ship, rail, and truck, as well as on-site storage and deployment, using existing infrastructure.

In an embodiment, the system 200 can include at least one battery stack container 202 and at least one pair of anolyte and catholyte storage containers 204, 206. For example, assuming each battery stack container 202 is within in a 10 foot×40 foot container and each of the anolyte and catholyte storage containers 204, 206 is within a 10 foot×20 foot container, the system can provide energy storage equivalent to 0.5 MW for 1 hour.

Figure 2E:
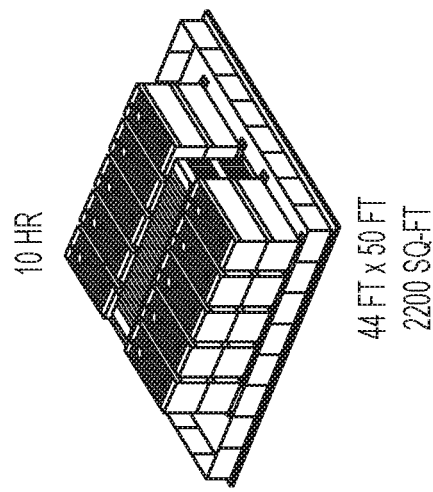
FIGS. 2C-2E illustrate embodiments of the modular flow battery system of FIGS. 2A-2B employing varying numbers of electrolyte containers.
Figure 2D:
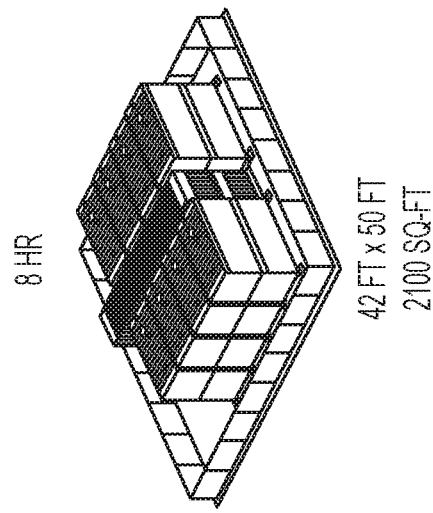
Figure 2C:
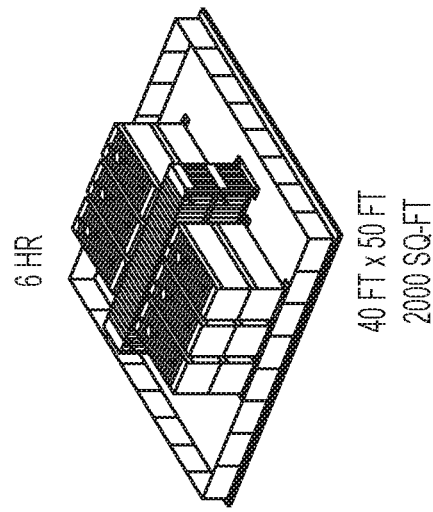

Owing to the modular aspects of the system, additional battery stack containers and/or pairs of electrolyte storage containers can be added to scale the power and energy storage provided by the system without a large change in the area occupied by the system. In the embodiment of FIG. 2C the system can include two stacked levels, each including a battery stack container of about 10 foot by 40 foot in fluid communication with three pairs of electrolyte containers, each in the form of a 10 foot by 20 foot container. The total area of the system of FIG. 2C can be about 40 foot by about 50 foot. (2000 ft$^2$) and the energy capacity can be about 1 MW for 6 hr. As compared to FIG. 2C, the system of FIG. 2D adds an additional pair of anolyte and catholyte containers to each layer in FIG. 2D and the system of FIG. 2E adds two additional pairs of anolyte and catholyte containers to each layer. The total area of the system of FIG. 2D can be about 42 foot by 50 foot (2100 ft$^2$) and its energy capacity can be about 1 MW for 8 hr. The additional 100 ft$^2$ of area can be occupied by overhang of one pair of the anolyte and catholyte storage containers in the front of the battery stack container. FIG. 2E illustrates an embodiment of the system including two stacked levels, each including a battery stack container in fluid communication with four pairs of anolyte and catholyte containers. The total area of the system of FIG. 2E can be about 44 foot by about 50 foot (2200 ft$^2$) and its energy capacity can be about 1 MW for about 10 hr. The additional 100 ft$^2$ of area can be occupied by overhang of one pair of electrolyte storage containers in the front and back of the battery stack container. Notably, in each of the embodiments of FIGS. 2D and 2E, additional energy storage of about 1 MW for about 2 hours can be provided for a relatively small increase in their footprint (e.g., about ft$^2$ with respect to the embodiment of FIG. 2C.

In further embodiments, not shown, two or more of the modular flow battery systems can be electrically coupled in a parallel configuration on a direct current (DC) bus. For example, two modular flow battery systems, each individually providing 1 MW DC, can be placed in parallel to provide a 2 MW system. In further embodiments, to provide higher power systems, multiple 1 MW or 2 MW modular flow battery systems can be paralleled at the utility side of an isolation transformer.

Additionally, that embodiments of the modular flow battery system 200 can be provided in electrical communication with one or more of the following external systems to facilitate integration with an electrical grid: inverters (power conversion systems), transformers, battery system controllers, grid controllers, interconnecting and protection equipment, and chiller-heater units. Additional information regarding these external systems is discussed in detail below.

In additional embodiments, of the modular flow battery system 200 can be installed at sites that can be configured to provide containment of liquid electrolytes that escape from the electrolyte containers. For example, in one embodiment, the ground located under and/or adjacent to the flow battery system can covered with a material configured to absorb the liquid electrolytes, preventing ground contamination. In the event of an electrolyte leak, any contaminated material that has absorbed an electrolyte can be removed. In another embodiment, the ground located under and/or adjacent to the flow battery system can be covered with a barrier layer that is substantially impermeable to the liquid electrolyte. Channels can be further formed within this barrier layer to direct the liquid electrolyte to a containment vessel. In either case, ground and/or groundwater contamination can be mitigated or avoided entirely.

Figure 3A:
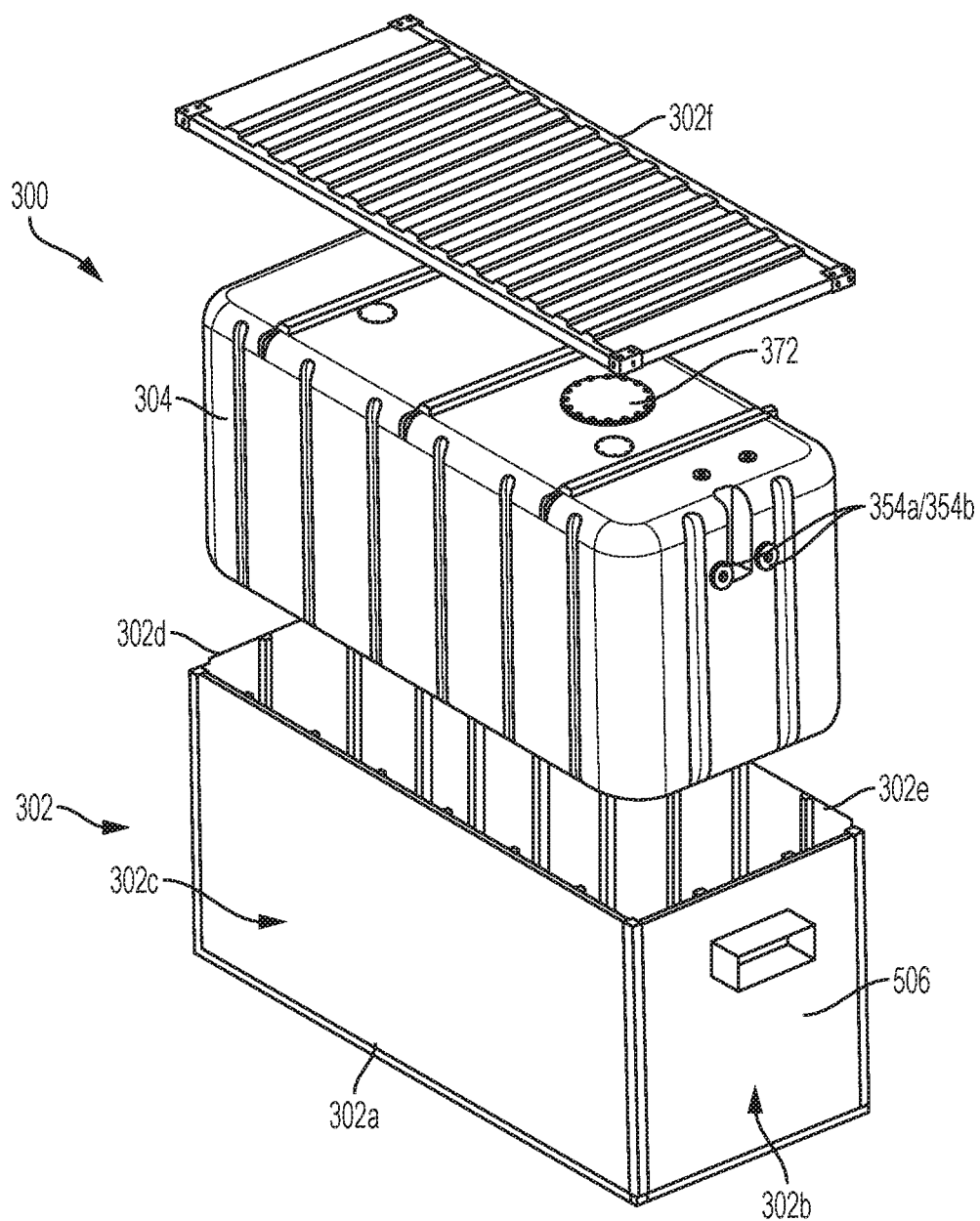
FIG. 3A is an isometric view illustrating an embodiment of an electrolyte container of the modular flow battery system of FIGS. 2A-2B.
Figure 3B:
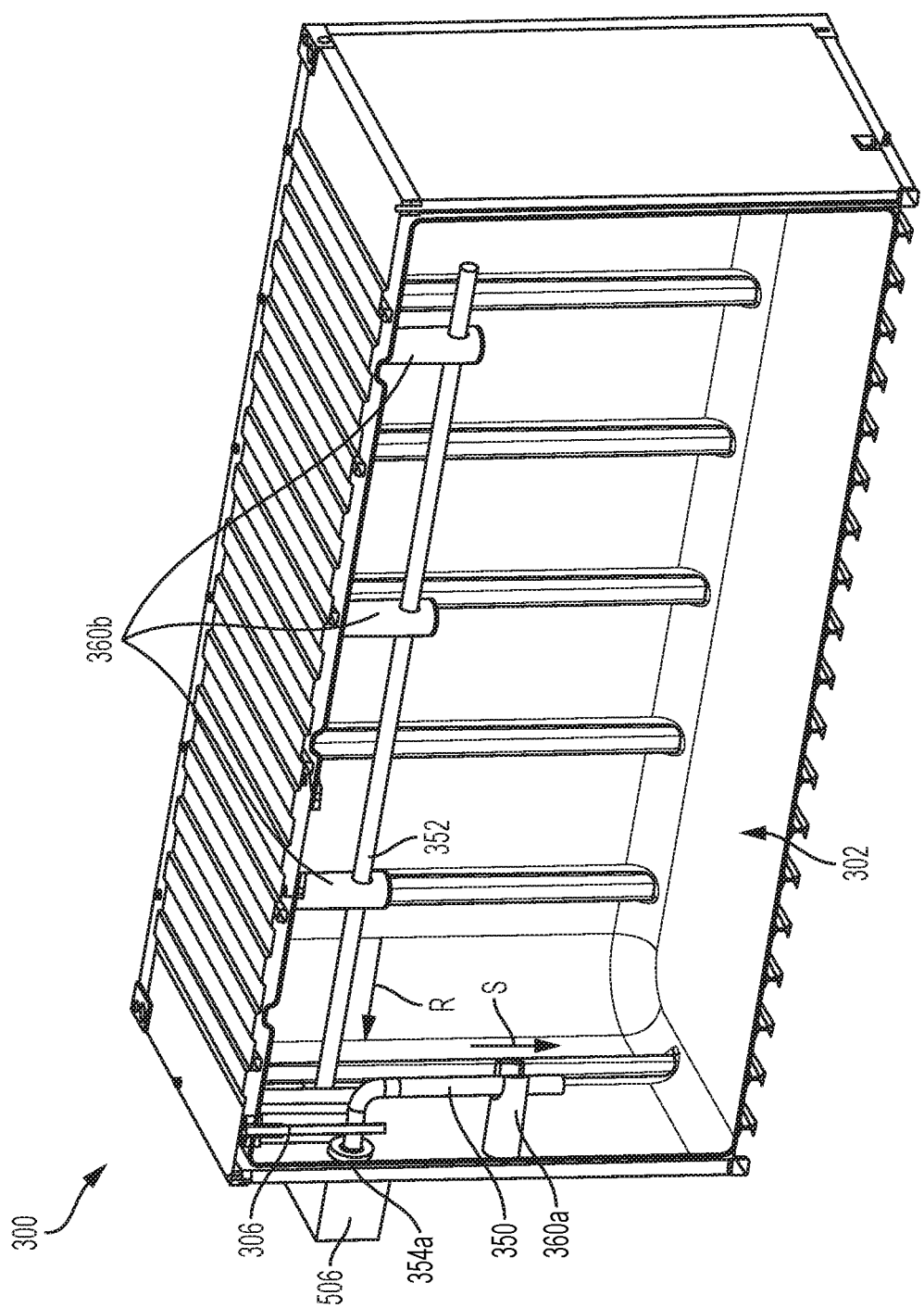
FIG. 3B is a cross-sectional view of the electrolyte container of FIG. 3A illustrating an embodiment of supply and return pipes.

An embodiment of the anolyte and/or catholyte containers 204, 206 in the form of an electrolyte container 300 is illustrated in FIGS. 3A-3B. With reference to FIG. 3A, the electrolyte container 300 can include an electrolyte container housing 302 dimensioned to receive a tank 304 therein. The electrolyte container housing 302 can include a base 302a, sidewalls 302b-302e, and a cover 302f that form the outer walls of the electrolyte container 300. In certain embodiments, the electrolyte container housing 302 can be formed from steel with a reinforced base. The electrolyte container housing 302 can also be substantially liquid-tight to provide secondary containment of the liquid electrolyte in the event of escape from the tank 304. For example, the electrolyte container housing 302 can be configured to support a pressure of about −1 psig.

As discussed above, in general, the size of the electrolyte container housing 302 can be selected to facilitate domestic and international transportation. For example, the length of the electrolyte container housing 302 can be approximately 19 ft. 10.5 in., a standard length for ocean transport in a normal ship location. The width of the container housing can be approximately 8.5 ft., which at present is the maximum width for domestic road transport in the United States without an oversized permit. The height of the container housing 302 can be approximately 9.5 ft., which is at present the maximum height for domestic road transport in the United States with a standard chassis and without an oversized permit. However, it may be understood that, in alternative embodiments, the dimensions of the electrolyte container housing can be varied based upon standards for container transportation adopted by specific industries and/or legal jurisdictions (e.g., countries, states/provinces, etc.).

The tank 304 can be configured to contain a liquid electrolyte therein. In one aspect, the tank 304 can be formed from any material resistant to attack by the liquid electrolyte. Suitable materials forming the tank 304 can include, but are not limited to, medium and high density polyethylene (HDPE). The tank material can molded in the shape of the electrolyte container housing 302 (e.g., a rectangular shape) and positioned therein. In such embodiments, the tank 304 can be bonded (e.g., welded) to the electrolyte container housing 302 to substantially inhibit sliding of the tank 304 with respect to the electrolyte container housing. In alternative embodiments (not shown), the tank can be a liner that is applied to an interior surface of the container housing.

The dimensions of the tank 304 can be varied. In certain embodiments, one or more of the outer walls of the tank (e.g., the base, the sidewalls, and the cover) can be approximately 0.25 in. thick. Assuming the tank is provided in the shape of an ISO standard 20 ft. shipping container (e.g., approximately 20 ft.×8.5 ft.×9.5 ft.), a volume of the tank can be approximately 10,000 gallons. In another aspect, the tank can be configured to provide high voltage isolation between the electrolyte and grounded container frame. For example, the tank can provide at least up to about 20 kV DC and about 400 TΩ/in$^2$ at 20 years.

The electrolyte container is illustrated in cross-section in FIG. 3B to show components configured to provide fluid communication of the liquid electrolyte with the battery stack container 202. As shown, the electrolyte container 300 can include a supply pipe 350 and a return pipe 352. A supply flange 354$a$ and a return flange 354$b$) can be respectively coupled to the supply pipe 350 and the return pipe 352. In certain embodiments, the pipe flanges 354$a$, 354$b$ can be formed in a sidewall of the electrolyte container 300. In further embodiments, the pipe flanges 354$a$, 354$b$ can be formed on a short wall (e.g., an end-facing wall) to facilitate efficient spatial distribution of multiple electrolyte containers 300 adjacent to the battery stack container 202.

In an embodiment, the supply and return pipes 350, 352 can be installed by a tank vendor prior to shipment. When the modular flow battery system 200 is in use, each of the supply and return pipes 350, 352 can be submerged in the liquid electrolyte, and the liquid electrolyte can flow to and from the battery stack container via the supply and return pipes 350, 352, respectively (see arrows S and R designating a supply flow of electrolyte into the electrolyte container 300 and a return flow of electrolyte out of the electrolyte container 300). The supply pipe 350 can include a portion that is angled downward and the return pipe 352 can extend approximately horizontally within the tank 304. This configuration of the supply and return pipes 350, 352 can substantially eliminate the need for dual-wall external piping and it can allow electrolyte containers 300 to be stacked without concern for damaging the supply and return pipes 350, 352. Similar to the tank 304, each of the return and supply pipes 350, 352 can be formed from a material capable of withstanding chemical attack from the liquid electrolyte (e.g., HDPE).

In further embodiments, the electrolyte container 300 can include a filling system 306. For example, the electrolyte container 300 can be shipped empty and filled with the liquid electrolyte on site. The filling system 306 can be configured to allow the liquid electrolyte to be added to the tank 304 without exposure to the atmosphere. For example, the filling system 306 can include a channel that extends through a wall of the tank 304 and an anti-syphon valve (not shown). So configured, an electrolyte can be directed into the tank 304 through the channel and the anti-syphon valve can inhibit flow of electrolyte from the tank 304.

Each of the supply and return pipes 350, 352 can further engage respective supply and return pipe supports 360$a$, 360$b$ to provide mechanical support for the supply and return pipes 350, 352 during transport. Similar to the tank 304, each of the pipe supports 360$a$, 360$b$ can be formed from a material capable of withstanding chemical attack from the liquid electrolyte (e.g., HDPE).

Figure 4A:
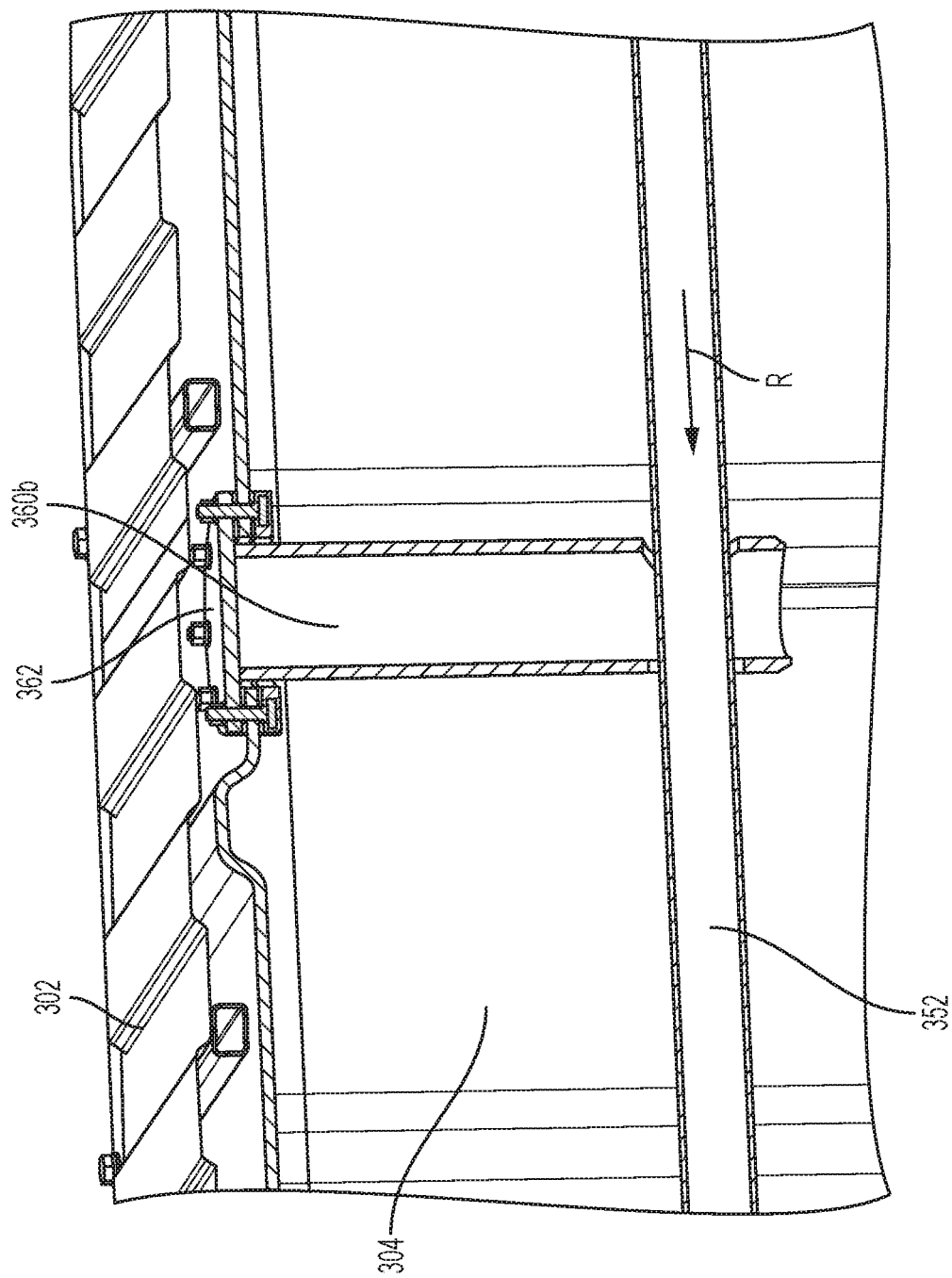

As illustrated in greater detail in FIGS. 4A-4B, each return pipe support 260$b$ can be formed as a hollow tube with a transverse opening extending therethrough to receive the return pipe 352. A support flange 362 can be secured to a terminal end of the return pipe support 360$b$ (e.g., fusion welded). The return pipe support 360$b$ can be secured to the electrolyte container housing 302 at the support flange 362 by a plurality of bolts. For example, as illustrated in FIG. 4B, a bolt ring 364 (e.g., a polyethylene encapsulated stainless steel bolt ring) can be positioned on an inner surface of the tank 304 and one or more bolts of the bolt ring 364 can extend through a wall of the tank 304 to engage the support flange 362. Seals 366 (e.g., gaskets) can also be positioned on each side of the bolts (e.g., between the tank 304 and the support flange 362 and between the tank 304 and the bolt ring 364) to that inhibits leakage of the electrolyte from the tank at the flange. Belleville washers, also known as disc springs 370, can be positioned around each bolt (e.g., between the seal 366 and a corresponding nut of the bolt), to apply a pre-load to the seal 366.

Figure 4C:
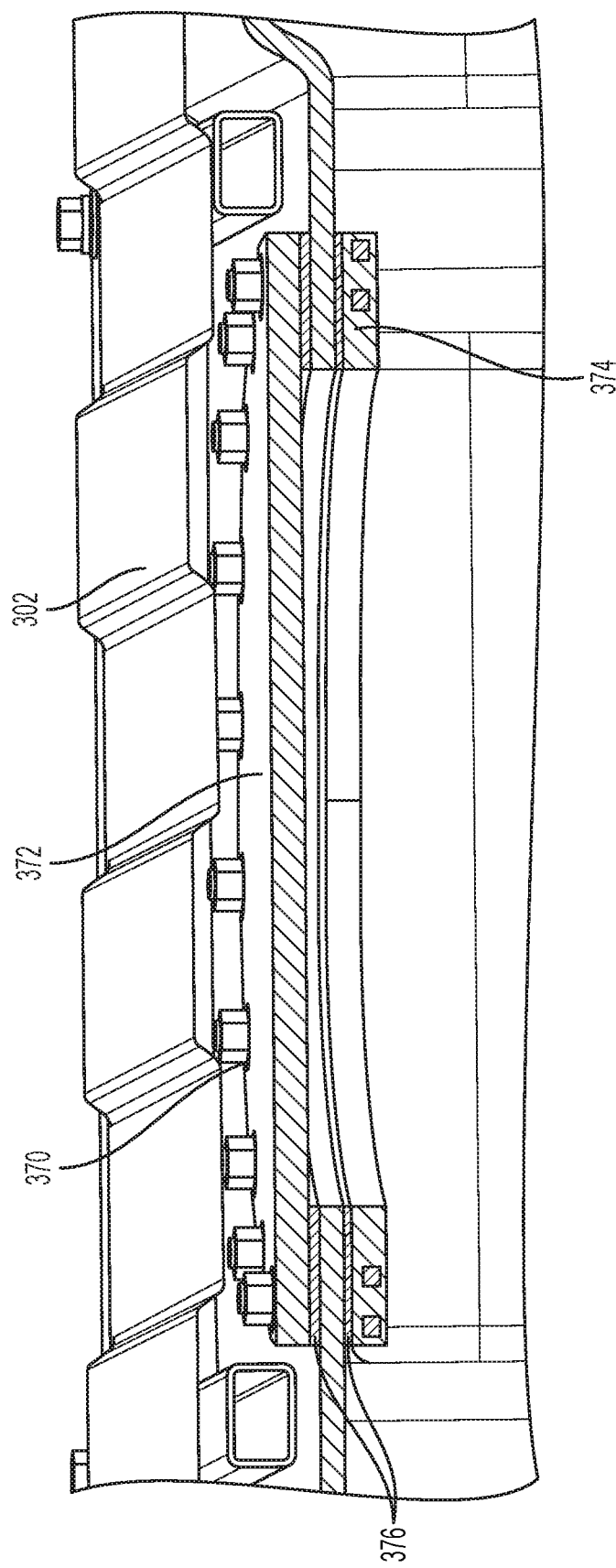
FIG. 4C is a cross-sectional view of the electrolyte container of FIG. 3A illustrating an embodiment of a manway.

The tank 304 can further include a manway 372 (e.g., in a roof of the tank 304) for maintenance access, as illustrated in detail in FIG. 4C. The manway 372 can be dimensioned allow a worker to enter the tank 304 for installation of components therein, including, but not limited to, the supply and return pipes 350, 352, the supply and return supports 360$a$, 360$b$, the manway 372, etc. The manway 372 can be formed from a material capable of withstanding chemical attack from the liquid electrolyte (e.g., HDPE). The manway 372 can be secured to the exterior facing wall of the tank 304 by a plurality of bolts. For example, as illustrated in FIG. 4C, a bolt ring 374 can be positioned on an inner surface of the tank 304 (e.g., a polyethylene encapsulated stainless steel bolt ring) and the plurality of bolts of the bolt ring 374 can extend through the wall of the tank 304 to engage the manway 372. Seals 376 can also be positioned around each bolt of the bolt ring 374 and they can be interposed between on each side of the bolt (e.g., between the tank 304 and manway 372 and between the tank 304 and the bolt ring 374) to inhibits leakage of the electrolyte from the tank 304 at the manway 372. Disc springs (not shown) can be positioned around each bolt (e.g., between the manway 372 and corresponding nuts of the bolt ring 374, to apply a pre-load to the seals 376. The manway 372 can be installed by a tank vendor prior to shipment.

Figure 5A:
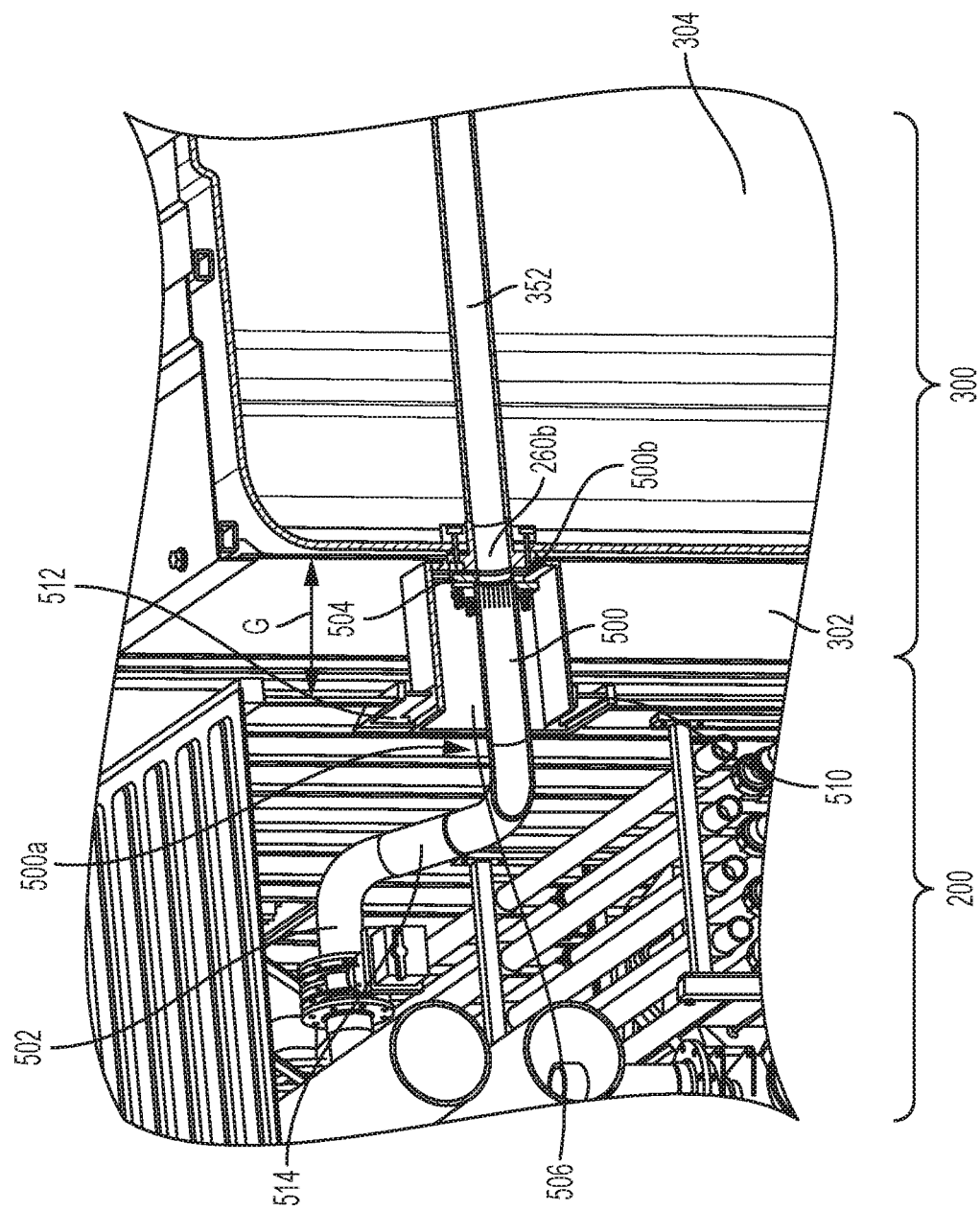
FIGS. 5A-5B present cross-sectional views the electrolyte container of FIG. 3A illustrating of embodiments of connections coupling the battery stack container to the electrolyte container.
Figure 5B:
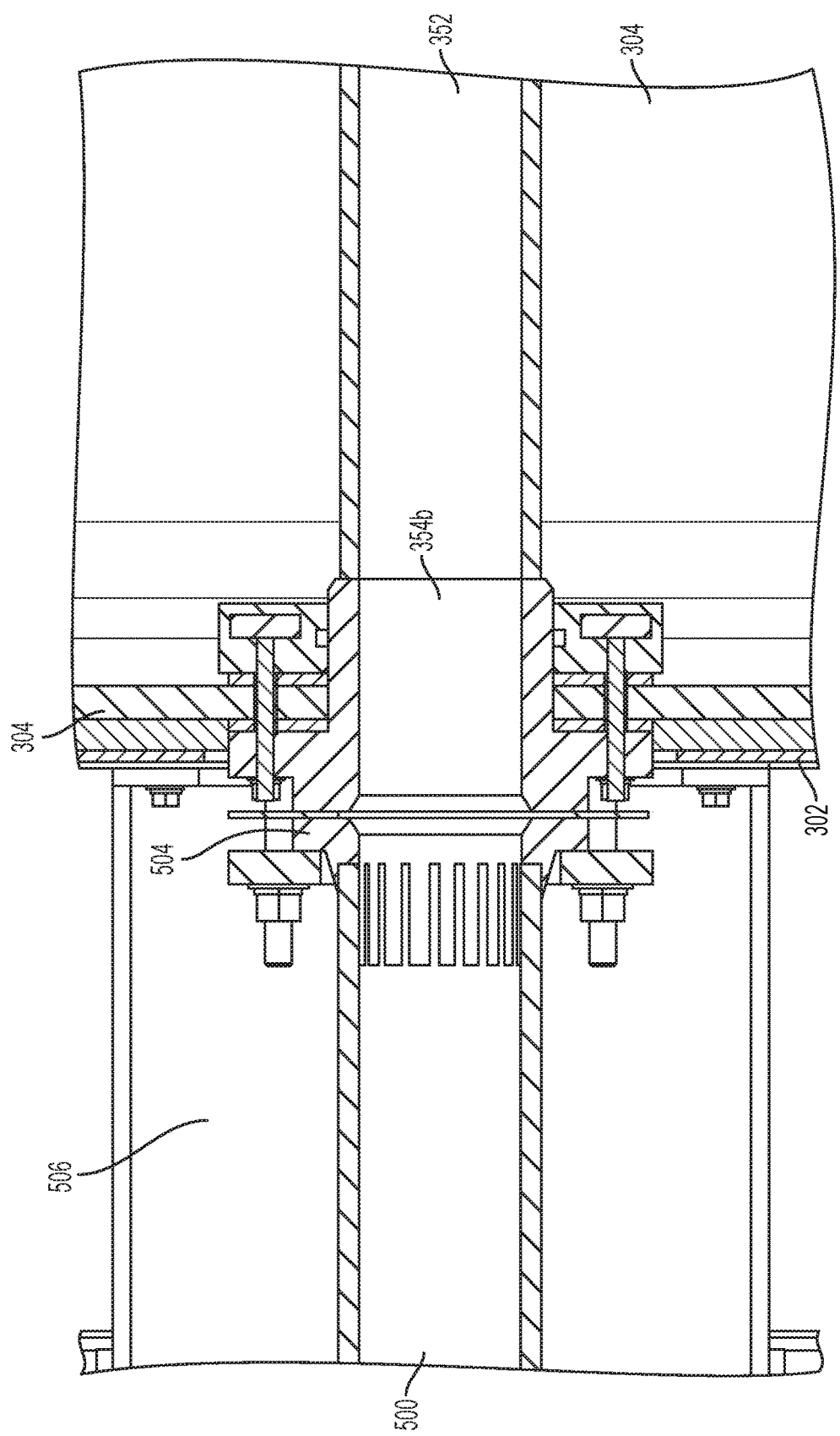

FIGS. 5A-5B is a cross-section view of embodiments of the battery stack container 202 and the electrolyte container 300 in fluid communication via one or more pipe connections 500. As discussed in detail below, the pipe connections 500 can be configured to allow flow of anolyte and catholyte solutions between the battery stack container 202 and the electrolyte container 300. As shown, the pipe connection 500 can be a tubular structure extending between a first end 500$a$ and a second end 500$b$ and it can be configured to form a substantially fluid tight seal between the battery stack container 202 and the electrolyte container 300. The first end 500$a$ can be secured to a terminal end of an electrolyte conduit network 502 of the battery stack container 202 (e.g., by a weld). The second end 500$b$ can include a pipe connection flange 504 configured to couple to the return pipe 352 via the return flange 354$b$ (e.g., via a bolt ring providing a substantially fluid tight seal between the pipe connection 500 and the return flange 354$b$). In certain embodiments, a diameter of the pipe connection 500 and the return flange 354$b$ can be approximately equal (e.g., about 4 inches).

The pipe connection 500 can extend along a gap G extending between the battery stack container 202 and the electrolyte container 300. The gap G can be dimensioned to provide sufficient clearance for installation and maintenance of the pipe connection 500. A containment sleeve 506 can be provided to protect the pipe connection 500 (e.g., from impact damage). As shown, the containment sleeve 506 is dimensioned to span the gap G (e.g., horizontally) and laterally enclose the pipe connection (e.g., vertically). One end of the containment sleeve 506 can be coupled to the electrolyte container 300 (e.g., welded). An opposing end of the containment sleeve 506 can be received within a floating panel 510 formed through a sidewall of the battery stack container 202 and surrounded by a seal (e.g., a gasket). Embodiments of the pipe connection 500, the pipe connection flange 504, and the containment sleeve 506 can be formed from a material capable of withstanding chemical attack from the liquid electrolyte (e.g., HDPE).

As further illustrated in FIG. 5A the fluid conduit network 502 can also include a plurality of stress-relieving features 512, such as "dog-leg" connections. For example, dogleg connections can be configured to provide the fluid conduit network 502 with sufficient compliance to accommodate dimensional changes arising from thermal expansion/contraction and manufacturing tolerances.

While illustrated in the context of the return pipe 352 return flange 260 in FIGS. 5A-5B, embodiments of the pipe connections 500 and containment sleeve 506 can also be employed to couple the supply pipe and supply pipe flange of the electrolyte container to the battery stack container. In further embodiments, the electrolyte container can be a catholyte-containing electrolyte container or an anolyte-containing electrolyte container.

Figure 6B:
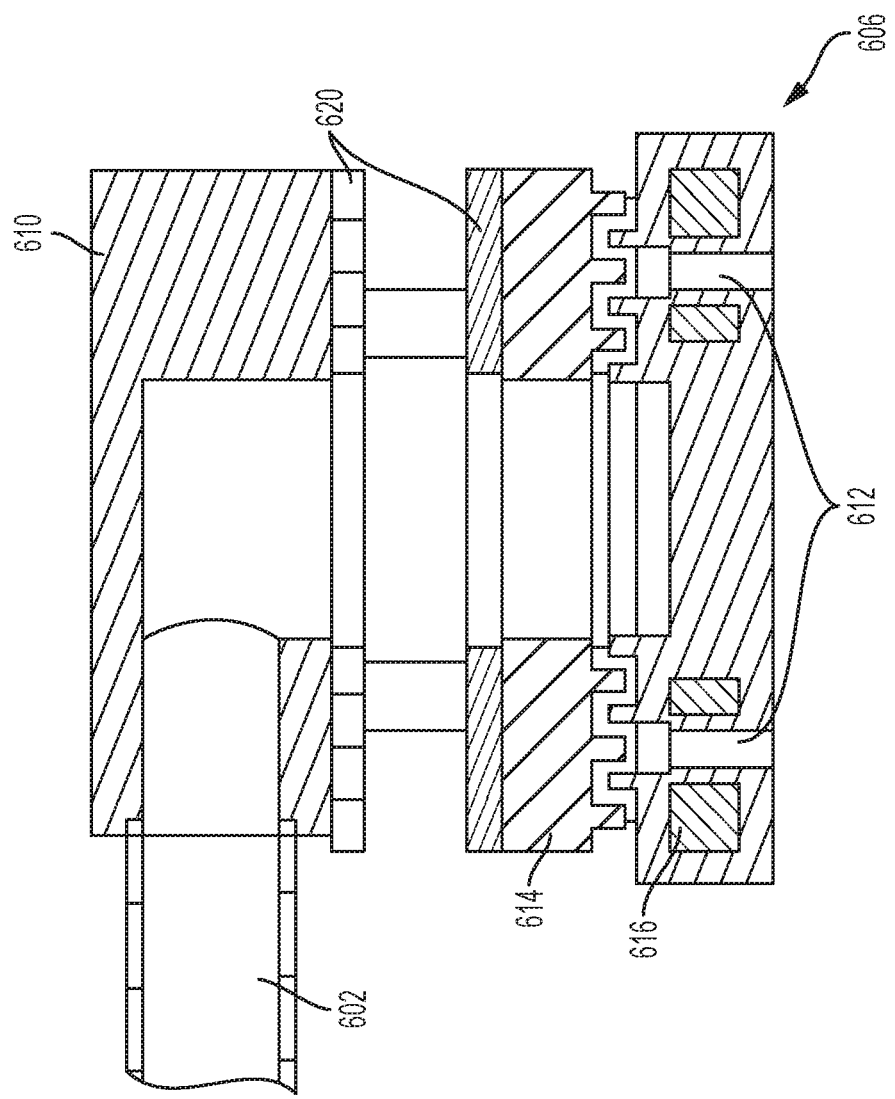

FIGS. 6A-6B an embodiment of a nitrogen system of the electrolyte container 300 is illustrated. In combination with the liquid-tight nature of the tank 304 itself, the nitrogen system can substantially inhibit contact of the liquid electrolyte with the environment external to the electrolyte container 300 (e.g., atmosphere). For example, the nitrogen system can supply nitrogen at low pressure to fill an empty space 600 at the top of the tank 304, also referred to as a "nitrogen blanket." This setup can be desirable because the charged anolyte can become oxidized when placed in contact with environmental oxygen, turning into a species having a higher oxidation state.

Nitrogen can be provided to the electrolyte container 300 from an external source. In certain embodiments, the external nitrogen source can be housed within the battery stack container 202. Examples of the nitrogen source can include, but are not limited to, any of a plurality of nitrogen containers, a plumbed, common liquid nitrogen ($LN_2$) system, or a nitrogen generator, alone or in combination. The volume of nitrogen employed by the nitrogen system can be relatively small, although some nitrogen can be bled through pressure relief valves during thermal expansion-contraction cycles.

The nitrogen can be delivered to the electrolyte container 300 through piping 602 including one or more valves (not shown), such as a single Pad supply valve and a single Depad valve per electrolyte container. The Pad valve can facilitate forming a nitrogen blanket by ensuring that a minimum pressure is maintained in the space 600 during normal use of the electrolyte container 300. The Depad valve can also facilitate vapor recovery by limiting tank pressure to a maximum value during normal use of the electrolyte container 300. While not shown, nitrogen piping in the battery stack container can be sloped to a low-point drain and leak sensor in the event of electrolyte backflow from the tank (not shown). The nitrogen conduit 602 can be formed from a material capable of withstanding chemical attack from the liquid electrolyte (e.g., HDPE) and is coupled to the nozzle (e.g., by a weld).

In an embodiment, nitrogen received from the battery stack container 202 can be routed through a cutout area 604 of the electrolyte container 300, positioned between the tank 304 and the electrolyte container housing 302. The nitrogen piping 602 can extend between the return flange 354b and a nitrogen nozzle 606. The nitrogen nozzle 606 can extend through a wall of the tank via a nitrogen flange 610. The nitrogen flange 610 can be in further fluid communication with a nitrogen nozzle 606. Nitrogen can flow through the nitrogen piping 602 to the nitrogen nozzle 606 to provide the nitrogen blanket within the tank 304.

FIG. 6B illustrates the nitrogen nozzle 606 in greater detail. The nitrogen conduit 602 can be joined do the nitrogen nozzle 606 using a low-profile (e.g., 90°) nitrogen flange 610. Beneficially, this low-profile design can allow substantially an entirety of the nitrogen system to be contained within the electrolyte container 300 and it can facilitate electrolyte container stacking.

The nitrogen nozzle 606 can include drain ports 612 for dispensing the nitrogen within the tank 304. Nitrogen received at the nitrogen flange 610 can be directed to the drain ports 612 via a labyrinth-style path 614 with a low point drain to mitigate electrolyte leakage. The drain ports 612 can be secured to the nitrogen flange 610 by a nitrogen bolt ring 616 (e.g., an HDPE encapsulated stainless steel bolt ring) can be employed to secure. Respective seals 620 (e.g., gaskets) can be interposed between the bolt ring 616 and the nitrogen flange 610 to inhibit electrolyte leakage from the tank 304.

Figure 7:
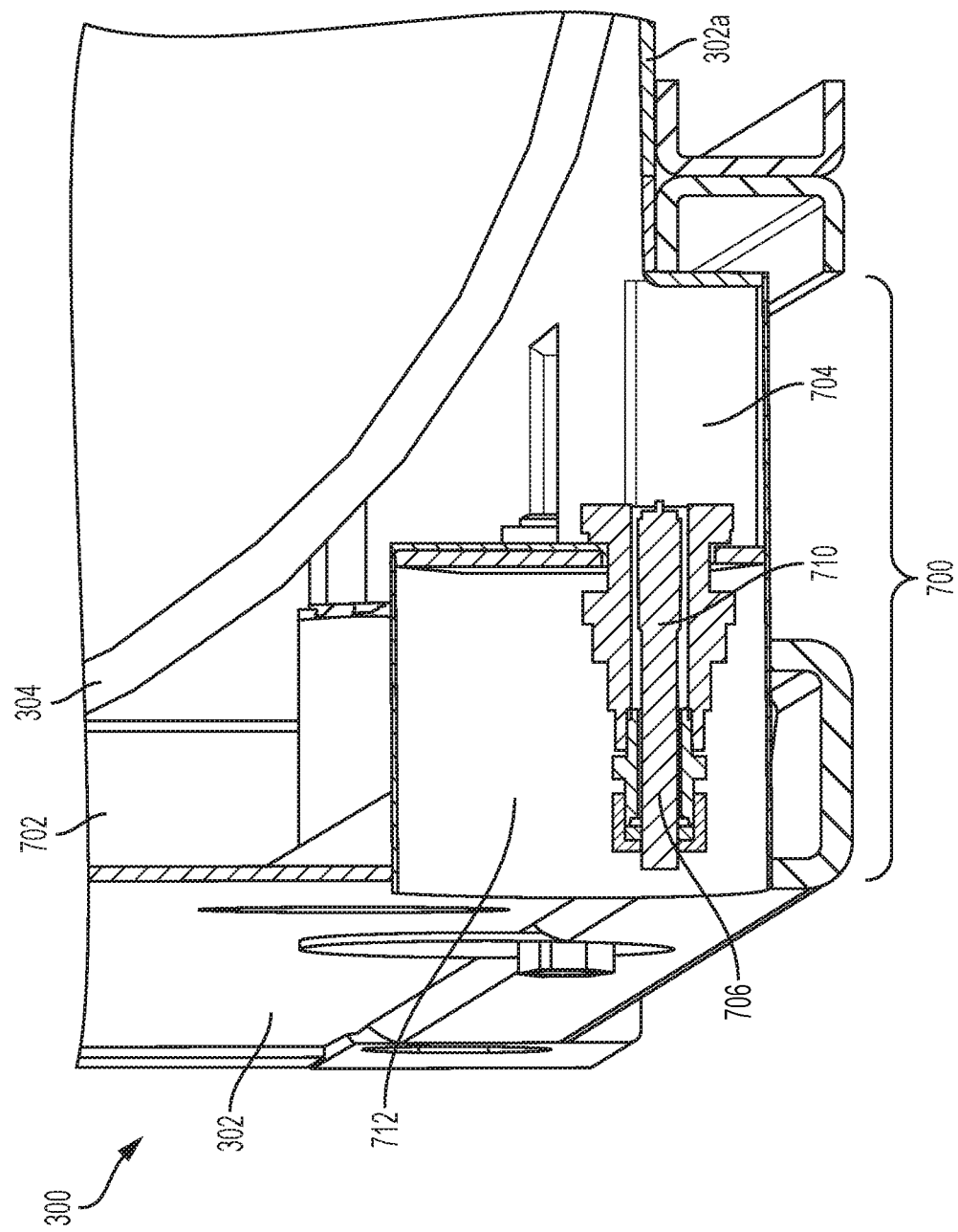
FIG. 7 is a cross-sectional view of the electrolyte container of FIG. 3A illustrating an embodiment of a leak sensor.

Embodiments of the electrolyte container 300 can further include a leak sensor system 700 for detection of liquid electrolyte that has escaped from the tank 304. As illustrated in FIG. 7, in one embodiment, the leak sensor system 700 can be positioned adjacent to the base 302a of the electrolyte container housing 302, within free space lying 702 between the electrolyte container housing 302 and the tank 304. The leak sensor system 700 can include a sump 704, a sensor 706, and a fitting 710 that allows fluid communication between the sump 704 and the sensor 706. Each electrolyte container 300 can include a plurality of leak sensor systems 700 at different locations of the electrolyte container 300 (e.g., at opposing sides) to allow detection of electrolyte leaks at the different locations and/or redundancy in case of failure of one leak sensor system 700.

The sump 704 can be positioned at a low point of the electrolyte container 300. This positioning can ensure early detection of electrolyte leaks since, in the event of electrolyte leakage, the electrolyte can flow to the lowest point within the electrolyte container 300 under the influence of gravity. The sump 704 can be designed to receive leaked electrolyte for extended periods of time by including a surface coating or lining resistant to chemical attack by the electrolyte. As leaked electrolyte fills the sump 704, the highest level of the electrolyte can enters the fitting 710 and direct the electrolyte to the sensor 706.

In general, the sensor 706 can be any device capable of detecting the presence of water and/or the electrolyte. For example, the sensor 706 can be a conductivity-style sensor including a carbon element. In certain embodiments, the sensor 706 can be housed within a bulkhead 712 formed in the electrolyte container housing 302 and the fitting 710 can extend through the bulkhead 712.

In further embodiments, it is possible that small leaks can be of sufficiently low volume that they MAY not fill the sump 704 and be detected by the sensor 706. Under such circumstances, leak detection can be performed by backfilling another liquid (e.g., ethylene glycol) that has a relatively low electrical conductivity into the space 702 between the electrolyte container housing 302 and the tank 304 in volume exceeding that of the sump 704. When this liquid mixes with the electrolyte of the small leak, the electrical conductivity of the resulting mixture can be elevated above that of the added liquid alone. Thus, when the liquid mixture fills the sump 704, it can contact with the sensor. The sensor 706 can be configured to detect the liquid mixture based upon its electrical conductivity, thereby sensing the small leak. In certain embodiments, this backfilling can be performed manually, during a service interval.

In further embodiments, the electrolyte container 300 can include a drain 800 for controlled release of leaked electrolyte from the electrolyte container. As illustrated in FIG. 8, the drain 800 can be positioned within the bulkhead 712, extending through the electrolyte container housing 302, and it can include a plug 802, a valve 804 (e.g., a locking ball valve), and a fitting 806. The fitting 806 can provide a channel, allowing fluid communication between the valve 804 and the sump 704. In the event of electrolyte leakage, the electrolyte can flow to the sump 704 under the influence of gravity. The valve can be opened or closed to allow or inhibit fluid from exiting the electrolyte container 300 via the valve 804. The plug 802 can be removably positioned at a terminal end of the valve 804. Thus, the valve 804 and plug 802 can be configured to allow or inhibit fluid communication between the drain 800 and the atmosphere, as desired.

To check the electrolyte level within the tank 304, embodiments of the electrolyte container 300 can include a tank level sensor. In general, the level sensor can be configured for insertion and removal from electrolyte containers 300 while stacked upon one another. In certain embodiments, the tank level sensor can be any one of a capacitance-based sensor, an ultrasonic sensor, or a pressure-based sensor. In further embodiments, the tank level sensor can be configured to extend through the tank 304 and to a selected vertical location within the tank 304 (e.g., a lowest point of the tank 304). In this manner, the tank level sensor can be effective to measure the tank level between a pre-selected minimum and maximum level (e.g., from about the base of the tank 304 to about 75% of the height of the tank 304).

Figure 9C:
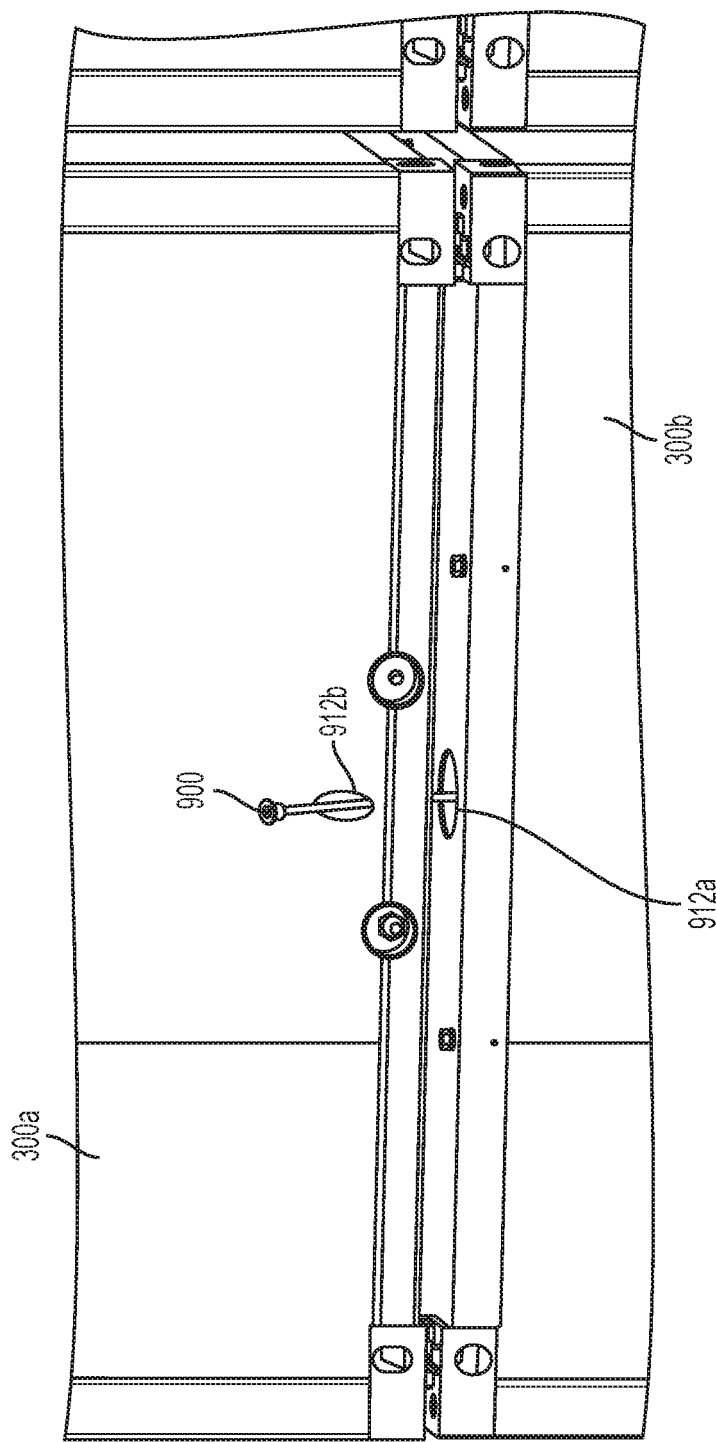

An embodiment of a capacitance-based tank level sensor 900 is illustrated in FIGS. 9A-9C. For clarity, electronics associated with the tank level sensor are omitted. The tank level sensor 900 can include a non-conductive outer sleeve 902 (e.g., a polymer such as HDPE) and a conductive tube 904 (e.g., aluminum or copper) that is fully encapsulated within the outer sleeve 902. FIG. 9A illustrates the tank level sensor 900 with the conductive tube 904 omitted to better show features of the outer sleeve 902. As shown, the outer sleeve 902 can include level sensor flange 906 at a terminal end (e.g. a top end). An opening 910 can be provided through the tank 304 to accommodate the level sensor flange 906 and the level sensor flange 906 can be sealingly engaged (e.g., fusion welded) to the tank 304 at the opening 910. In this manner, the tank level sensor 900 can access the top of the tank 304 and contact the electrolyte 912 stored therein without a trapped air pocket.

Embodiments of the electrolyte container 300 can be configured to facilitate use of the tank level sensor 900 when stacking at least two electrolyte containers 300, such as an upper electrolyte container 300a and a lower electrolyte container 300b. For example, the cover 302f of each of the electrolyte containers 300a, 300b can include a first level sensor opening 912a formed therethrough and a second level sensor opening 912b extending through one of the sidewalls 302b-302e. In further embodiments, the tank level sensor 900 can be angled so as to allow passage through the first level sensor opening 912a of the lower electrolyte container 300b and the second level sensor opening 912b of the upper electrolyte container 300a for insertion the lower electrolyte container 300b. In further embodiments, two or more tank level sensors 900 can be provided at different locations of the electrolyte container 300 (e.g., at opposing sides) to allow measurement of the tank level at the different locations and/or redundancy in case of failure of one tank level sensor.

Figure 10A:
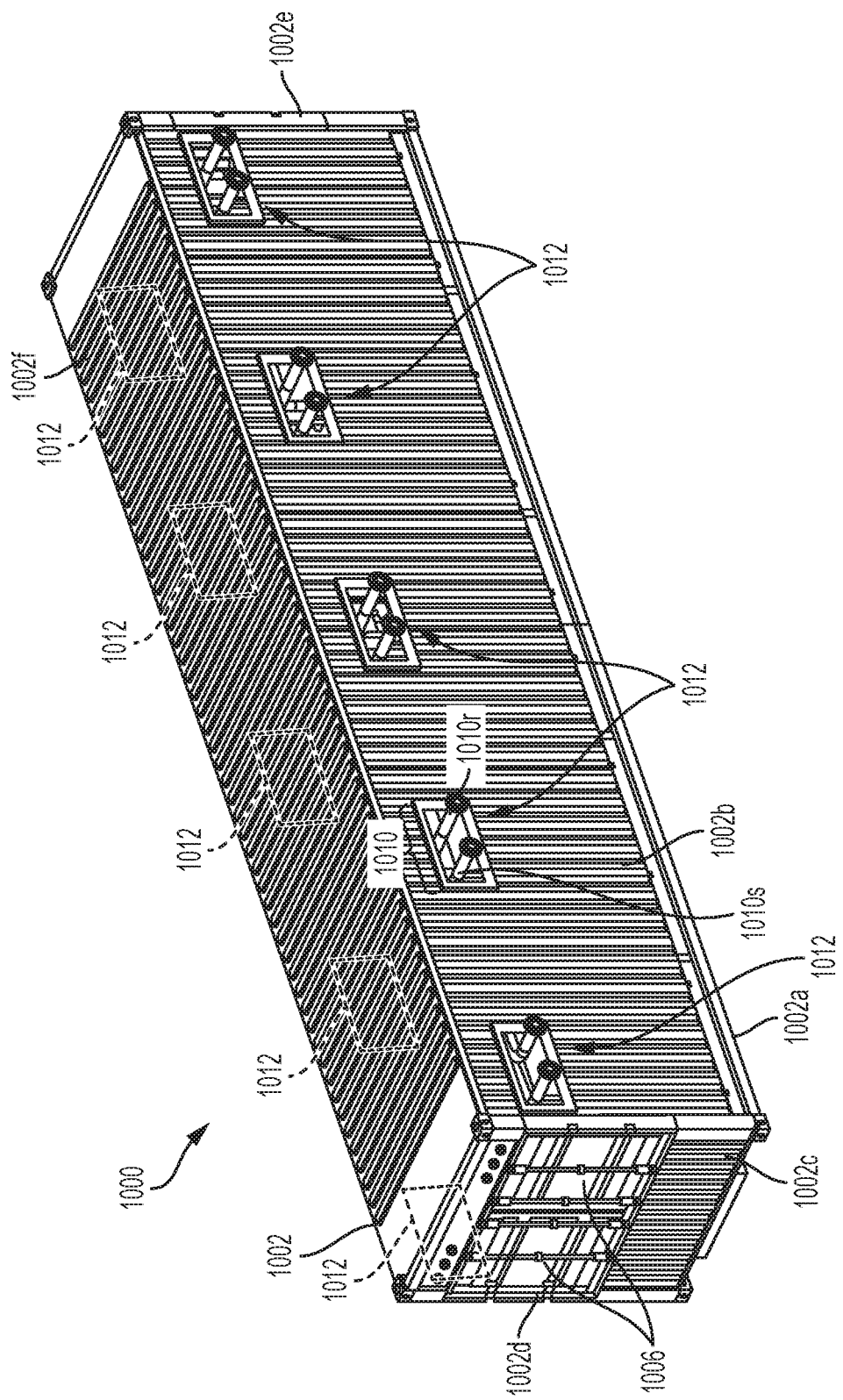
FIGS. 10A-10B illustrate embodiments of the stack container of FIGS. 2A-2B; (A) isometric view; (B) end view.
Figure 10B:
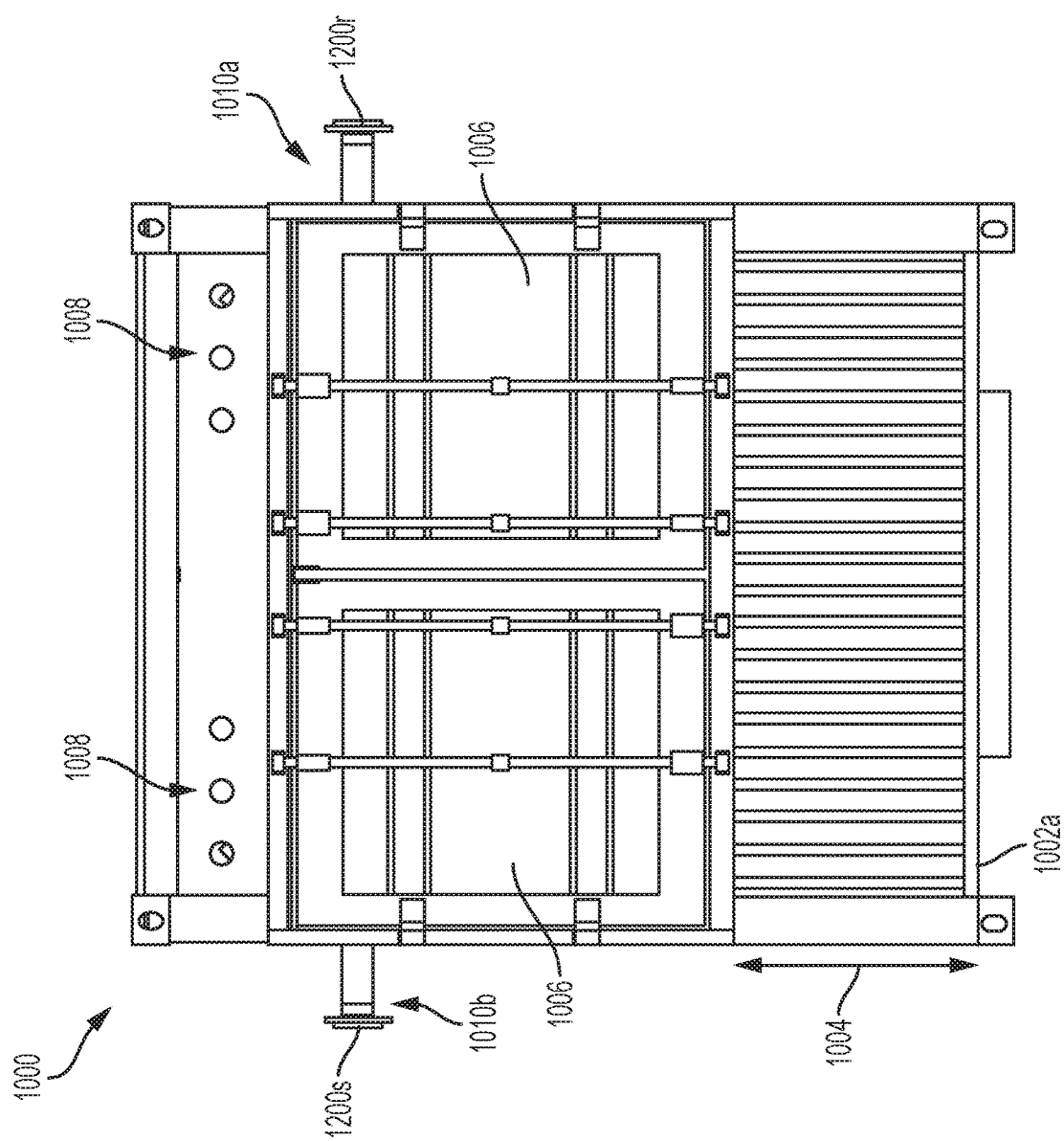

FIGS. 10A-10C illustrate embodiments of the battery stack container 202 in the form of a battery stack container 1000. The battery stack container 1000 can includes a battery stack container housing 1002 including a base 1002a, sidewalls 1002b, 1002c, 1002d, 1002e and roof 1002f that encloses components of the battery stack container 1000 (e.g., battery stacks, fluid conduit networks including pipes, pumps, valves, and the like for conveying anolytes and catholytes through the battery stack container 202, electrical connections, and other systems. Safety rated failsafe sensors (such as the leak sensing sensor system 700) can be placed one or more locations within the battery stack container 1000 and they can be configured to shut down the pumps and valves in the event that a leak is detected. Cameras (not \shown) may also be provided outside and/or inside the battery stack container to provide remote monitoring.

The battery stack container 1000 can also include a secondary containment 1004 in the event of escape of an electrolyte from the battery stacks or the fluid conduit networks. For example, as illustrated in FIG. 10B, the secondary containment 1004 can include a sealed bottom pan. The bottom pan can have an electrolyte-resistant coating and it can extend from approximately the base 1002a of the battery stack container 1000 to access doors 1006 (e.g., approximately 30 inches high). Assuming the battery stack container 1000 has the form factor of an ISO standard 40 ft. container and a 30% equipment displacement, the secondary containment 1004 can hold approximately 4000 gallons of electrolyte.

The battery stack container 1000 can be configured to facilitate minimum on-site labor and rapid commissioning. For example, the battery stack container 1000 can include access doors 1006 on both ends for service (e.g., 48 in wide and 54 in. high). In certain embodiments, all site power (AC, DC, Auxiliary) and cooling connections can be made to a connection panel 1008 on one end of the battery stack container 1000 without entering the battery stack container. Wiring to respective electrolyte containers 300 can be provided via pre-manufactured cable harnesses with environmental-rated mil-type circular connectors.

The battery stack container 1000 can be configured for placement between pairs of electrolyte containers 300 when deployed in service. Each battery stack container 1000 can include pairs of connections 1010 for fluid communication with electrolyte containers 300. As an example, the pair of connections 1010 can include a supply pipe 1010s and a return pipe 1010r for electrolyte flow between an electrolyte container 300 and the battery stack container 1000. In certain embodiments, the supply pipe 1010s and the return pipe 1010r can each be in the form of pipe connections 500, as discussed above with respect to FIG. 5. In certain embodiments, for each pair of connections 1010 provided on one side of the battery stack container 1000 (e.g., a long side such as 1002b, a corresponding pair of connections 1010 can be provided on an opposing side of the battery stack container 1000 (e.g., long side 1002d). To facilitate the modular design of the modular flow battery system 200, the battery stack container 1000 can include at least two pairs of connections 1010, where each connection pair 1010 can support an associated electrolyte container 300 (e.g., one connection pair for each electrolyte container 300. In certain embodiments, the supply and return pipes 1010s, 1010r can be approximately 4 in. diameter pipes.

The exact number of connection pairs 1010 can be selected based upon a desired run time of the system 200. For example, as illustrated in the embodiment of FIG. 10A, the battery stack container 1000 includes five connection pairs of supply and return pipes 1010s, 1010r on each side (e.g., 1002b, 1002d). Connection pairs that are in fluid communication with an electrolyte container 300 can be blanked off and sealed against weather.

Embodiments of the connection pairs 1010s, 1010r can extend through the battery stack container housing 1002 via respective apertures 1012 for coupling with the supply pipe 350 and the return pipe 352 of the electrolyte container 300. For example, each apertures can be in the form of the floating panel 510 discussed above in regards to FIG. 5. The apertures can be dimensioned to allow for a desired amount of radial float (e.g., 0.5 in.), providing for a degree of container misalignment and tolerance deviations.

Embodiments of battery stack banks and an associated fluid conduit network of the battery stack container 1000 are illustrated in FIGS. 11A-11D. Each battery stack container 1000 can include a one or more battery stacks 1100 and the battery stacks 1100 can be electrically wired with respect to one another to form battery stack banks 1102. The battery stack banks 1102 can in turn be wired in a selected electrical configuration with respect to one another to form a battery stack assembly 1104 capable of providing desired voltage and current levels. In certain embodiments, the battery stack banks 1100 can include a battery cells and/or battery stacks implemented in accordance one of the following: U.S. Pat. No. 9,774,044 ("Flow Battery Stack With An Integrated Heat Exchanger"; Filed on Sep. 21, 2011), US Patent Publication No. 2013/0029196 ("Flow Battery Cells Arranged Between An Inlet Manifold And An Outlet Manifold"; Filed on Jul. 29, 2011), U.S. Pat. No. 9,166,243 ("Flow Battery With Interdigitated Flow Field"; Filed on Dec. 18, 2009), US Patent Publication No. 2015/0263358 ("Flow Battery With Mixed Flow"; Filed Dec. 20, 2011), and U.S. Pat. No. 8,884,578 ("Method And System For Operating A Flow Battery System Based On Energy Costs"; Filed on Feb. 7, 2011), the entire content of each is hereby incorporated by reference herein. For example, in the embodiment illustrated in FIG. 11B, the battery stack container 1000 includes battery stack banks 1100 (e.g., 1100a, 1100b, 1100c, 1100d), two banks (1100a 1100b) on one side and two banks (1100c, 1100d) on the opposing side. Each of the battery stack banks 1100a, 1100b, 1100c, 1100d can be an electrically parallel element (e.g., 1S4P configuration). The of battery stack banks 1102 on each side are wired in series to one another (e.g., an overall 2S4P configuration). Each of these configurations is further wired in parallel (e.g., an overall 2S8P configuration of 16 stacks) to form the battery stack assembly 1104.

For example, assuming 125 cells per battery stack 1100, this configuration provides eight parallel strings of 250 cells in series to provide the rated power of the battery stack assembly 1104. Further assuming use of vanadium flow cells having a nominal potential of 1.4V, each battery stack 1100 can have a nominal potential of 175V and each battery container has a nominal potential of 350V.

In further embodiments, the battery stacks 1100 can be split into multiple sections. Continuing the example above in which each battery stack 1100 includes 125 battery cells electrically wired in series, a battery stack 1100 can be split into two electrolyte sections (e.g., in approximately half, where one electrolyte section includes 62 cells and the remaining battery electrolyte section includes 63 cells). Beneficially, such an arrangement can provide improved mitigation of shunt currents through external piping.

Each battery stack 1100 can include a close mounted contactor which can be capable of conservatively handling full system voltage and maximum stack current. This allows for staggered connection as well as electrical isolation of any battery stack 1100. The most positive side of the battery stacks 1100 on each side of the battery stack assembly 1104 can be individually fused, yielding eight fuses. The fuses can be designed to protect the wiring of the battery stack assembly 1104 in the event of a catastrophic short, and not merely an overload condition, as the maximum rated current falls well within their rating. For example, assuming that the fuses are rated at 400 amps each, the battery stack assembly 1104 can be protected at 3200 amps total.

Each of the battery stack banks 1102 can be bused together with copper bus bars and interconnected to other sets using copper cabling. All bus bars and cables can be rated for the full value of the protective fusing in order to meet the NEC wiring requirements and minimize wiring losses. A precision current shunt can be further provided to measure current in or out of the battery stack assembly 1104 as well as voltage measurement for each bank. These values can be reported to a battery stack controller, discussed below.

In additional embodiments, the battery stack container 1000 can include a lockable DC disconnect switch (not shown). The DC disconnect switch can be provided proximate to the access doors 1006 and it can be configured to isolate the DC power components inside the battery stack container 1000 from any components external to the battery stack container 1000. Such external components can include, but are not limited to, other battery stack containers, inverters, and forming power supplies (if connected). The DC disconnect switch can further be configured to provide direct visible verification that the contacts are in the open condition. So configured, the DC disconnect switch can aid in safe servicing of components of the battery stack container 1000, especially under circumstances where the battery stack container 1000 is serviced while other parts of the modular and scalable flow battery system 200 remain in operation.

Figure 11A:
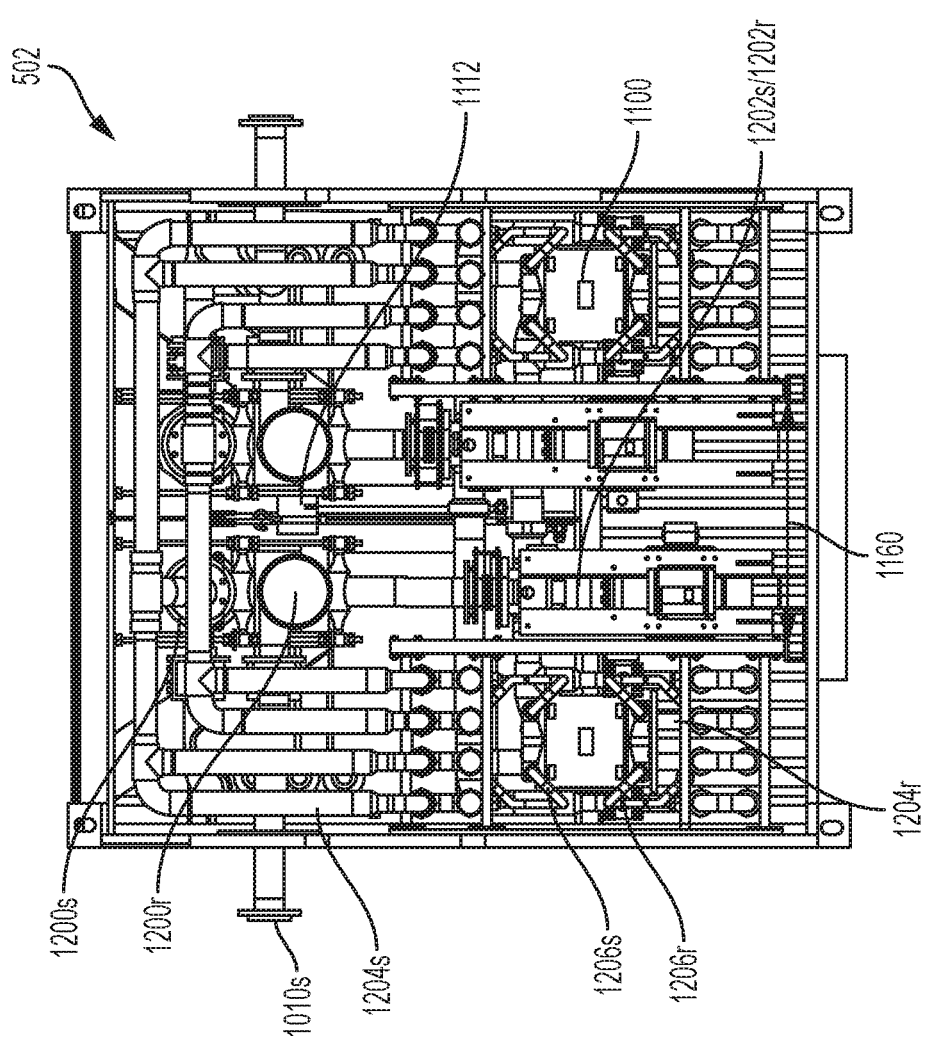
FIGS. 11A-11D present various views of an embodiment of battery stacks and a fluid conduit network contained within the battery stack container of FIG. 2A-2B; (A) end view; (B) cutaway view of 16 battery cell stacks; (C) isometric view of 4 battery cell stacks; (D) isometric end view illustrating removal of a battery cell stack from the container stack.
Figure 11B:
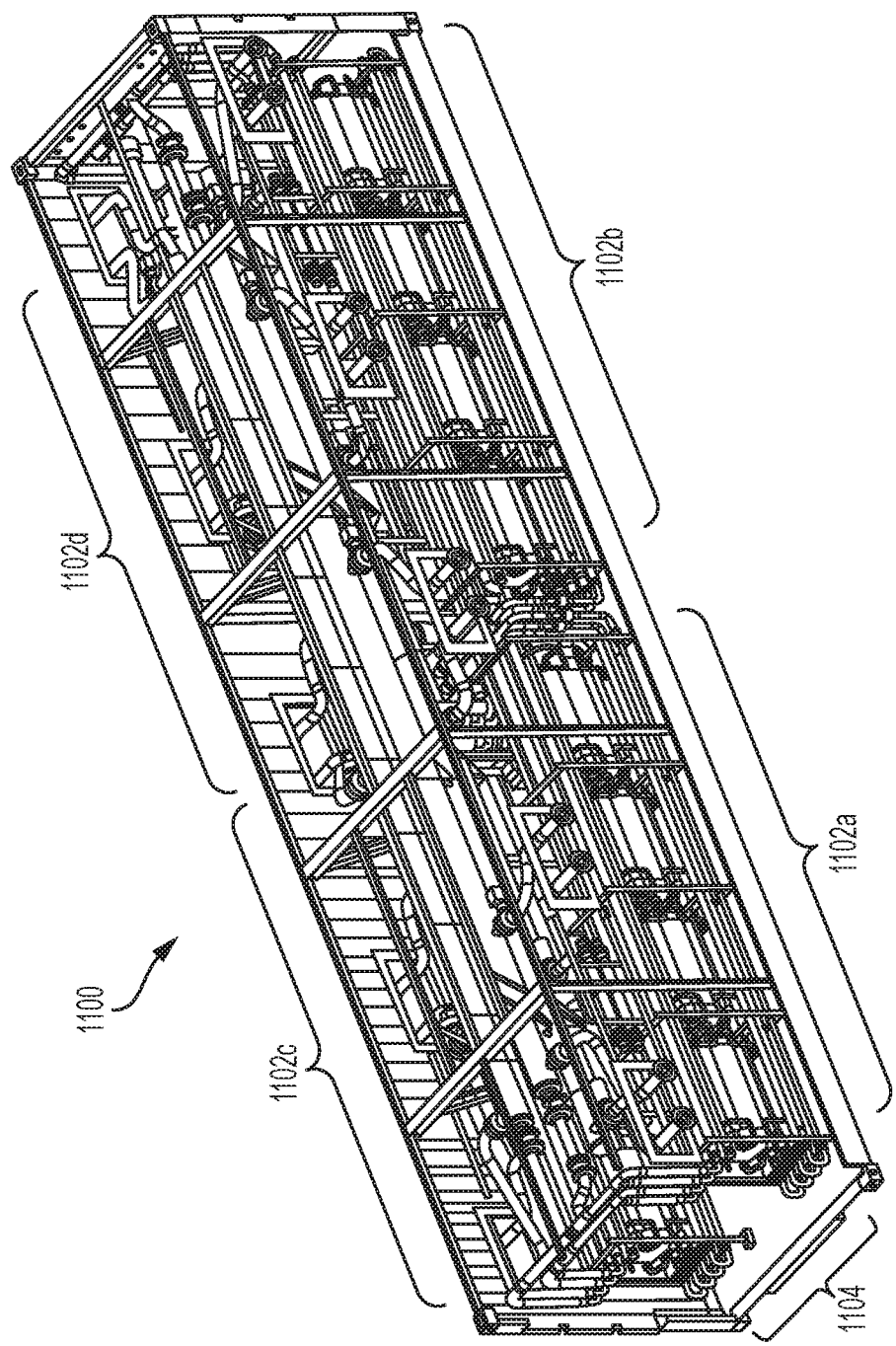
Figure 11C:
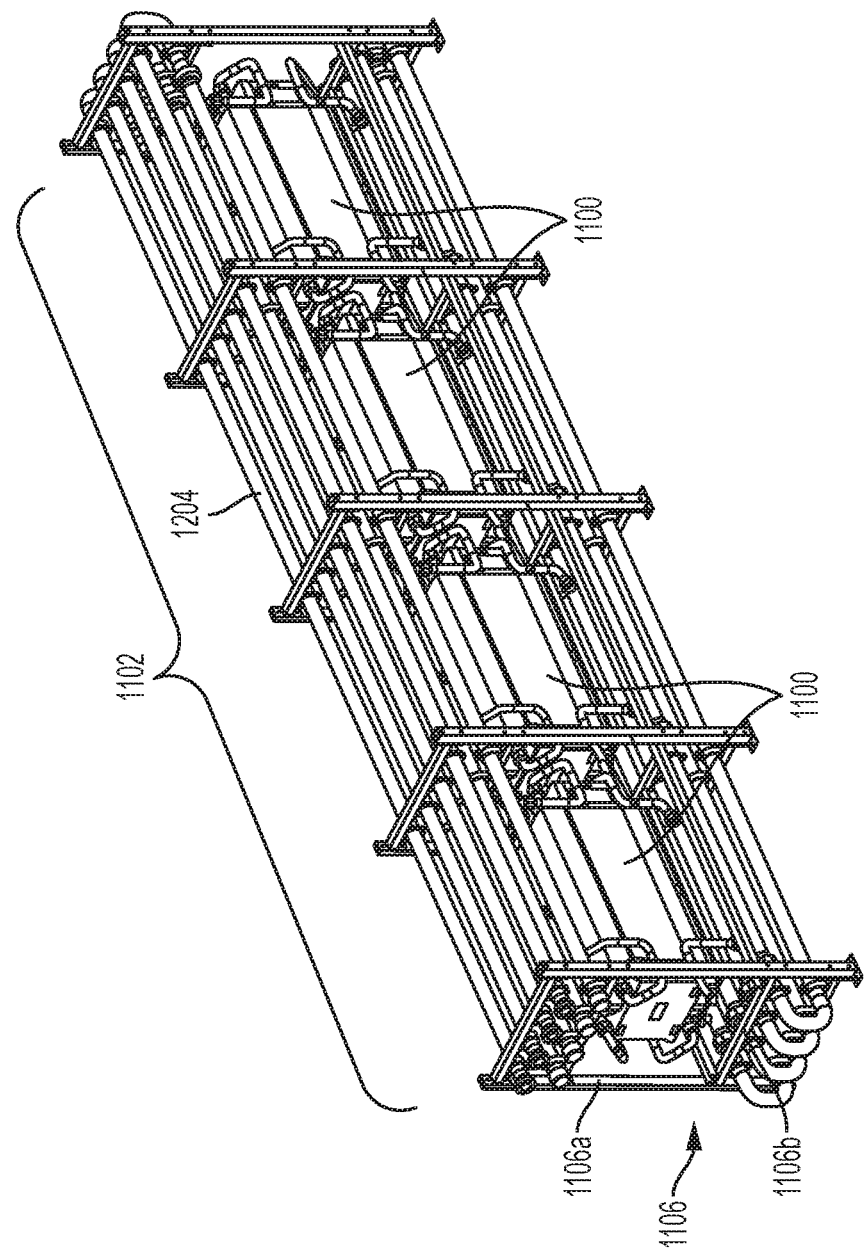

Each of the battery stacks 1100 can be mounted within a rack 1106 inside the battery stack container 1000. As shown in FIG. 11C, the rack 1106 includes vertical supports 1106a and horizontal supports 1106b. In an embodiment, the vertical supports 1106a can be formed in a 3 in. c-channel configuration. One side of the rack 1106 (e.g., a rear side) can be positioned against the battery stack container 10061100 and another, opposite side of the rack 1106 (e.g., a front side) can face the middle of the battery stack container 1000. In alternative embodiments (not shown), racks having battery stacks mounted thereto can be placed outside, rather than inside a battery stack container, and open to the environment.

Figure 11D:
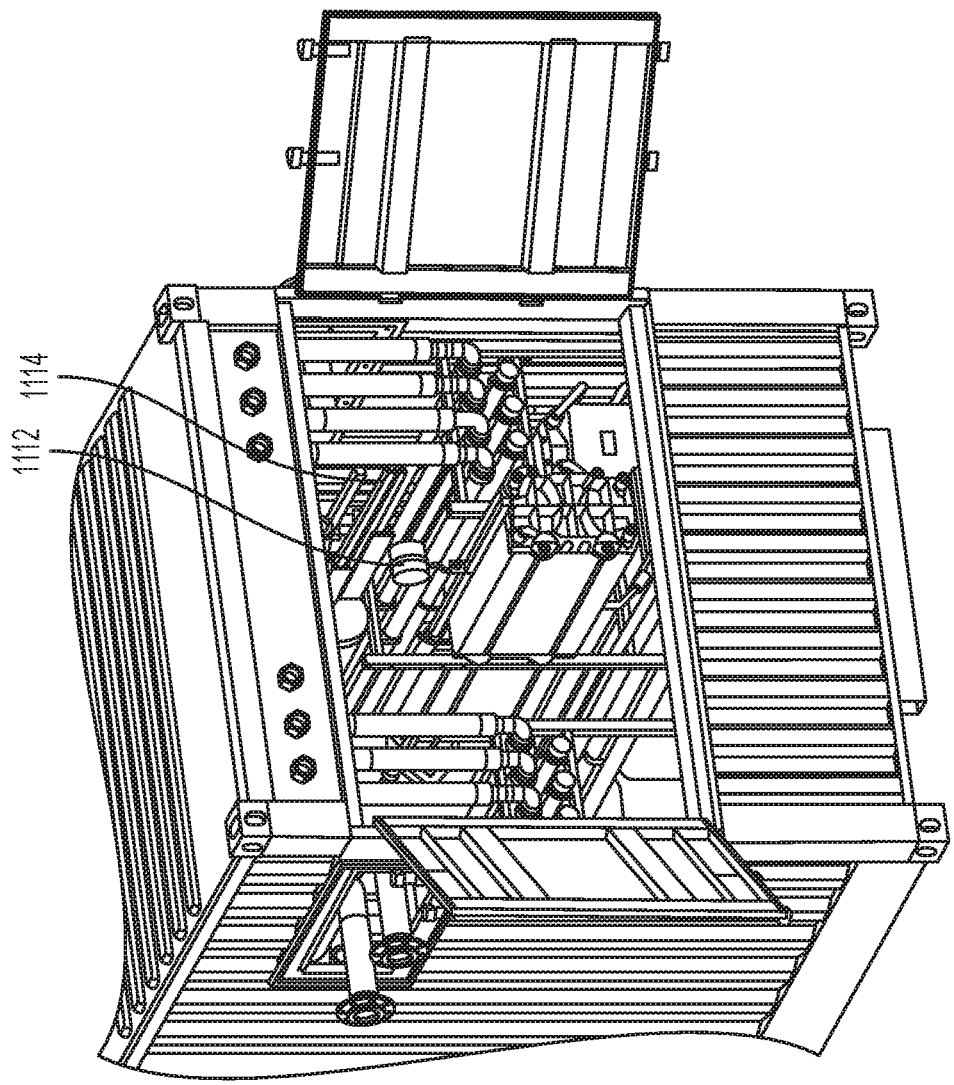

Embodiments of the battery stack container 1000 can also be configured to allow removal of selected battery stacks 1100 from the battery stack container 1000 for maintenance or replacement. For example, as shown in FIGS. 11A and 11D, the battery stack banks 1102 are positioned within the battery stack container 1000 such that an access space 1110 is provided. This access space 1160 can be dimensioned to provide sufficient clearance for a given battery stack 1100 to be removed laterally from its rack 1106 and guided longitudinally out of the battery stack container 1000 without substantially contacting adjacent racks or pipes of a fluid conduit network, discussed in greater detail below. The battery stack container 1000 can also include a hoist 1112 mounted to a removable beam extension 1114 to longitudinally move a given battery stack 1100 to facilitate removal from the battery stack container 1000.

Each battery stack 1100 can be connected to the fluid conduit network 502 to allow flow of the anolyte and catholyte therethrough. The fluid conduit network 502 can include respective main electrolyte manifolds 1200, electrolyte pumps 1202, shunt manifolds 1204, and battery stack manifolds 1206 for supply and return of each of the anolyte and catholyte. For example, respect to the supply, each electrolyte can enter the battery stack container 1000 through one or more respective supply pipes 1010s, as discussed above, each of which can be coupled to a respective supply main electrolyte manifold 1200s. The supply main electrolyte manifold 1200s can be large enough such that electrolyte flow into and out of the supply main electrolyte manifold 1200s can be approximately balanced (e.g., 10 in. pipes). The flow of electrolyte supply within the supply main electrolyte manifold 1200s can be directed to a supply electrolyte pump 1202s (e.g., a 200-400 gpm flow rate), and fed to the battery stacks 1100 through respective ones of supply shunt manifolds 1204s (e.g., 2 in. pipes) and supply battery stack manifolds 1206s to respective battery stacks 1100. The return electrolyte flows can proceed in the reverse, through separate return portions of the fluid conduit network 502 for each electrolyte, from the battery stacks 1100 through return battery stack manifolds 1206r, return shunt manifolds 1204r, return pump 1202r, and return main electrolyte manifold 1200r. From the return main electrolyte manifold 1200r, the electrolyte can exit the battery stack container 1000 via respective return pipes 1010r.

The shunt manifolds 1204 can include lengths of piping designed to mitigate excessive shunt current losses between cells in the battery stacks 1100. The battery stack container 1000 can house all the shunt manifolds 1204 necessary to reduce losses associated with the shunt currents to an acceptable level. Each of the shunt manifolds 1204 can serve to contain one of an anolyte supply to an associated battery stack 1000, a catholyte supply to an associated battery stack 1100, an anolyte return from an associated battery stack 1000, and a catholyte return from an associated battery stack 1100. In certain embodiments, the shunt manifolds 1204 can be approximately 2 in. diameter pipes and provide approximately 19 ft. of shunt distance. In further embodiments, the vertical supports 1106a of the rack 1106 can be removable (e.g., those on a front side facing towards the middle of the battery stack container 1000) to allow installation of the shunt manifolds 1204.

In an embodiment, the pumps 1202 can be driven by variable frequency drives (VFDs). This configuration can allow for independent, precise speed and consequently flow and pressure control of anolyte and catholyte. Smooth startup and detailed feedback on motor power parameters can also be provided. These VFDs can be powered by an auxiliary power panel controlled by a stack container controller, discussed in detail below.

Figure 12:
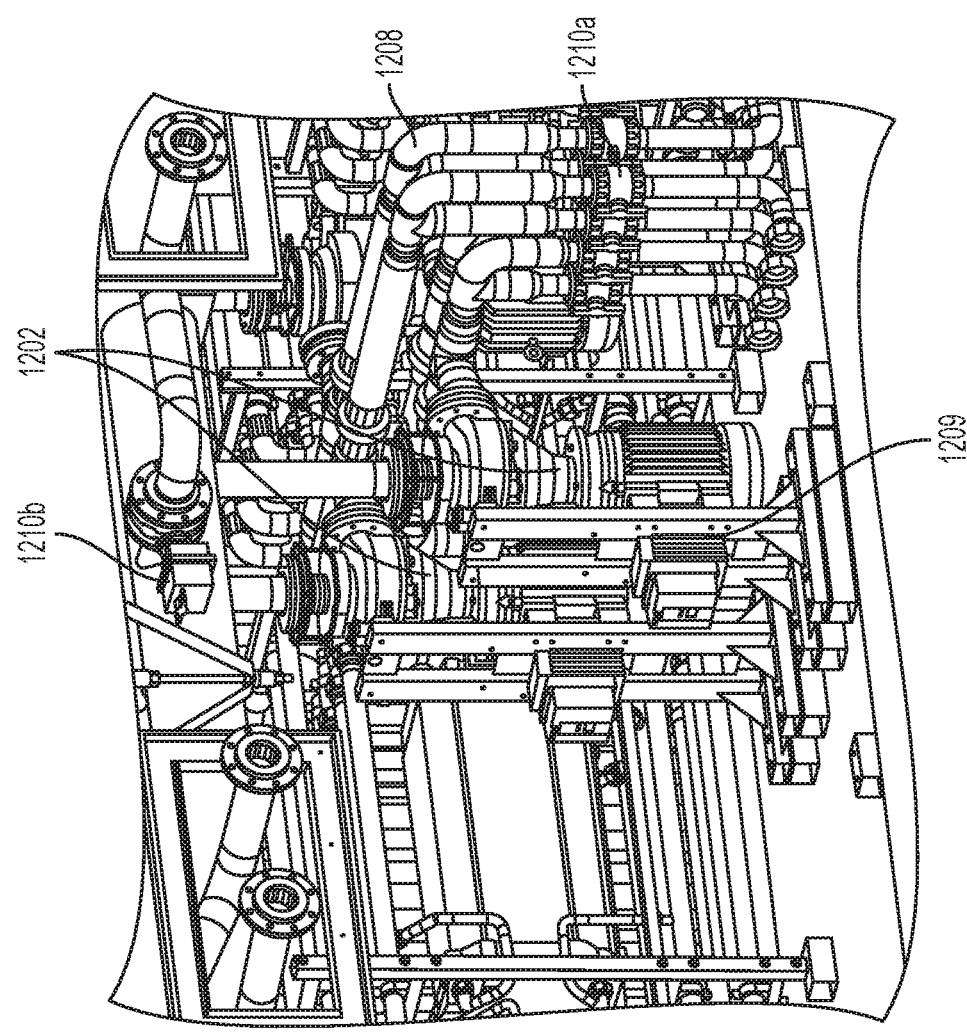
FIG. 12 illustrates an embodiment of pumps of the battery stack container of FIG. 2A-2B.
Figure 13A:
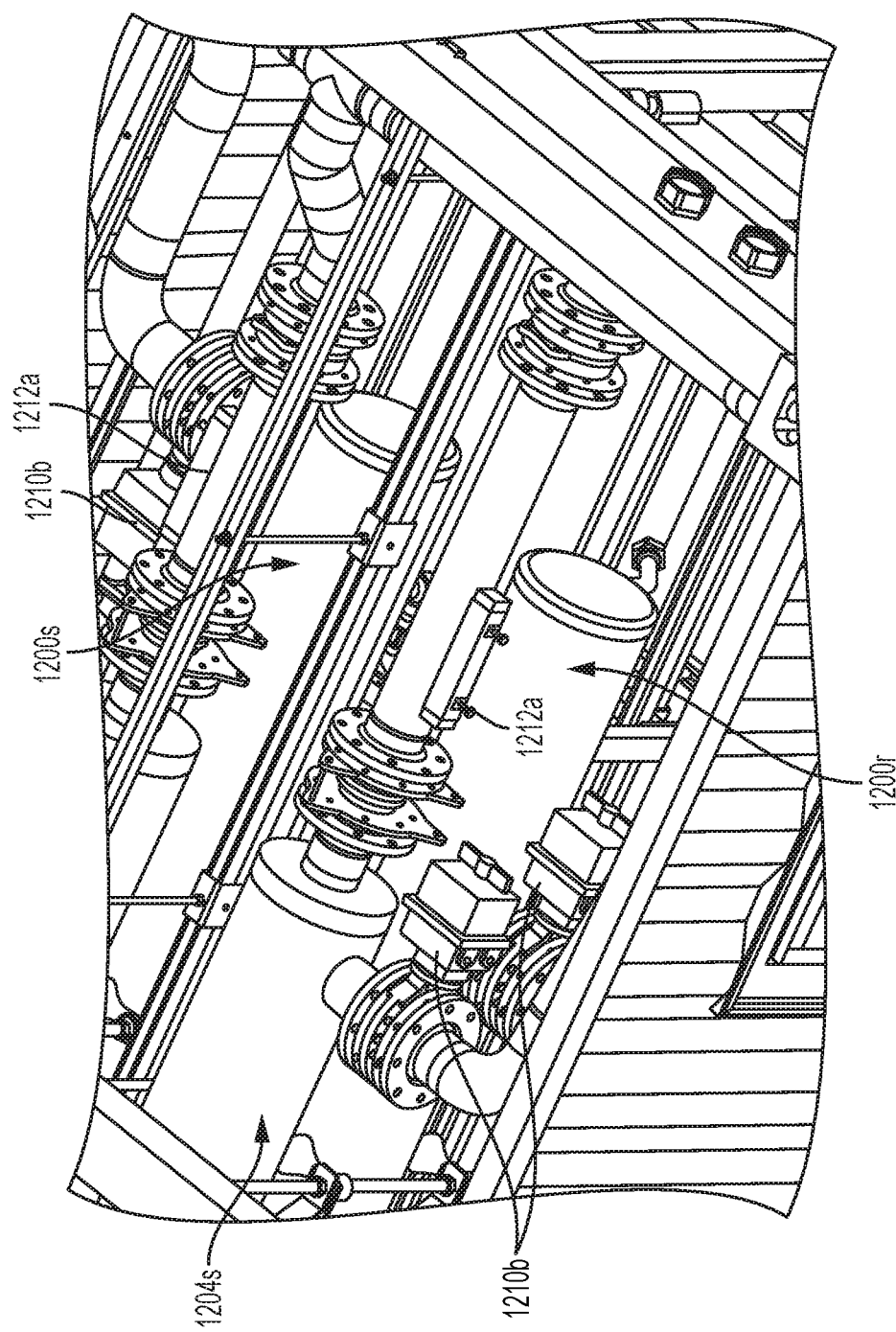
FIGS. 13A-13B illustrate embodiments of valves and sensors in communication with the fluid conduit network.
Figure 13B:
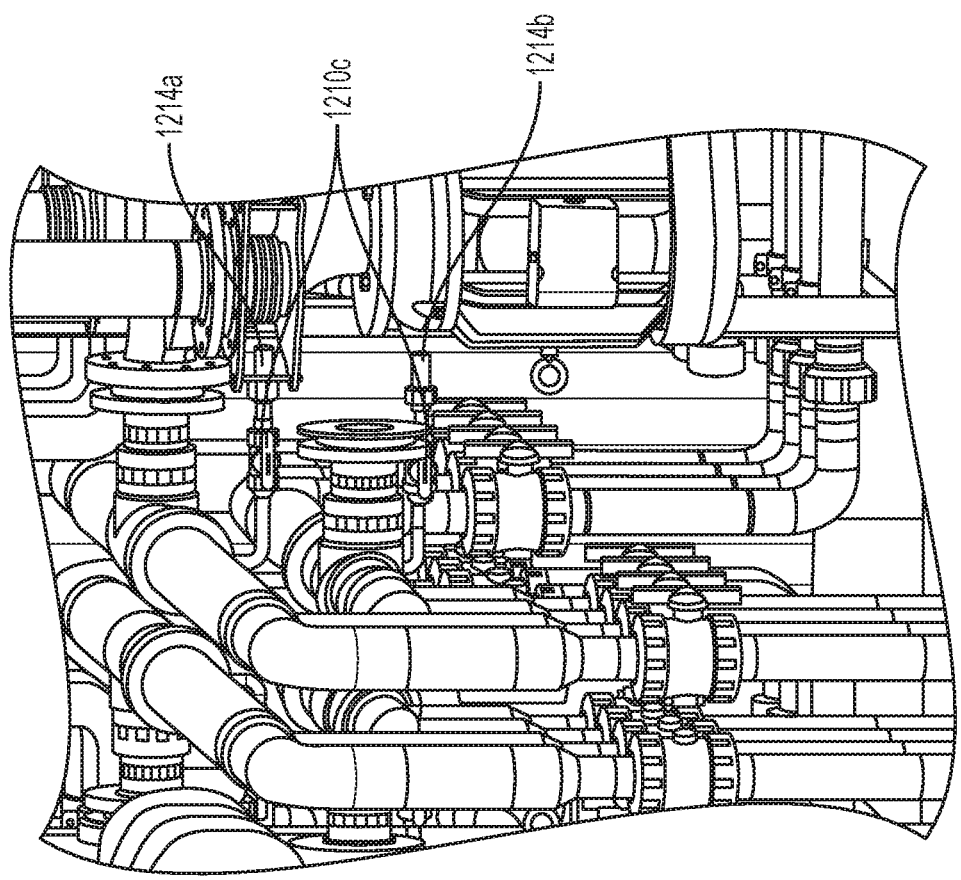

Embodiments of the fluid conduit network 502 can further include one or more valves (e.g., balancing valves, shutoff valves, etc.). In general, the valves can be employed to control flow for rebalancing levels, to shut off main feeds when the system 200 is off, and to isolate specific battery stacks 1100. The valves can include manual valves for service functions and automated valves for configurations when shutdown, startup, and various system functions are to be operated under the control of a stack container controller, discussed in greater detail below. For example, as illustrated in FIG. 12B, valves 1210a can be optionally provided in cross-tie manifolds 1208 that distribute electrolytes between respective pumps 1202 and shunt manifolds 1204 for shut-off or balancing. Valves 1210b can be further provided between the supply and return pipes 1010s, 1010r and the main electrolyte manifolds 1200r, 1200s (FIGS. 12B, 13A). Valves 1210c can be provided between shunt manifolds 1204 and battery stacks 1100 (FIG. 13B). Automated actuation of the valves 1210a, 1210b, 1210c can be provided by motors 1209 in communication with the battery stack controller When automated valves are used, feedback can be provided to ensure proper operation. In one embodiment, the fluid conduit network 502 can further include one or more sensors (e.g., temperature sensors, flow sensors, pressure sensors, optical sensors, etc.) configured for monitoring and/or feedback control of the valves 1210a, 1210b, 1210c and to regulate flow of the anolyte and catholyte therethrough during operation. Examples of anolyte and catholyte flow sensors 1212a, 1212b and anolyte and catholyte pressure sensors 1214a, 1214b are illustrated in FIGS. 13A, 13B.

Figure 14:
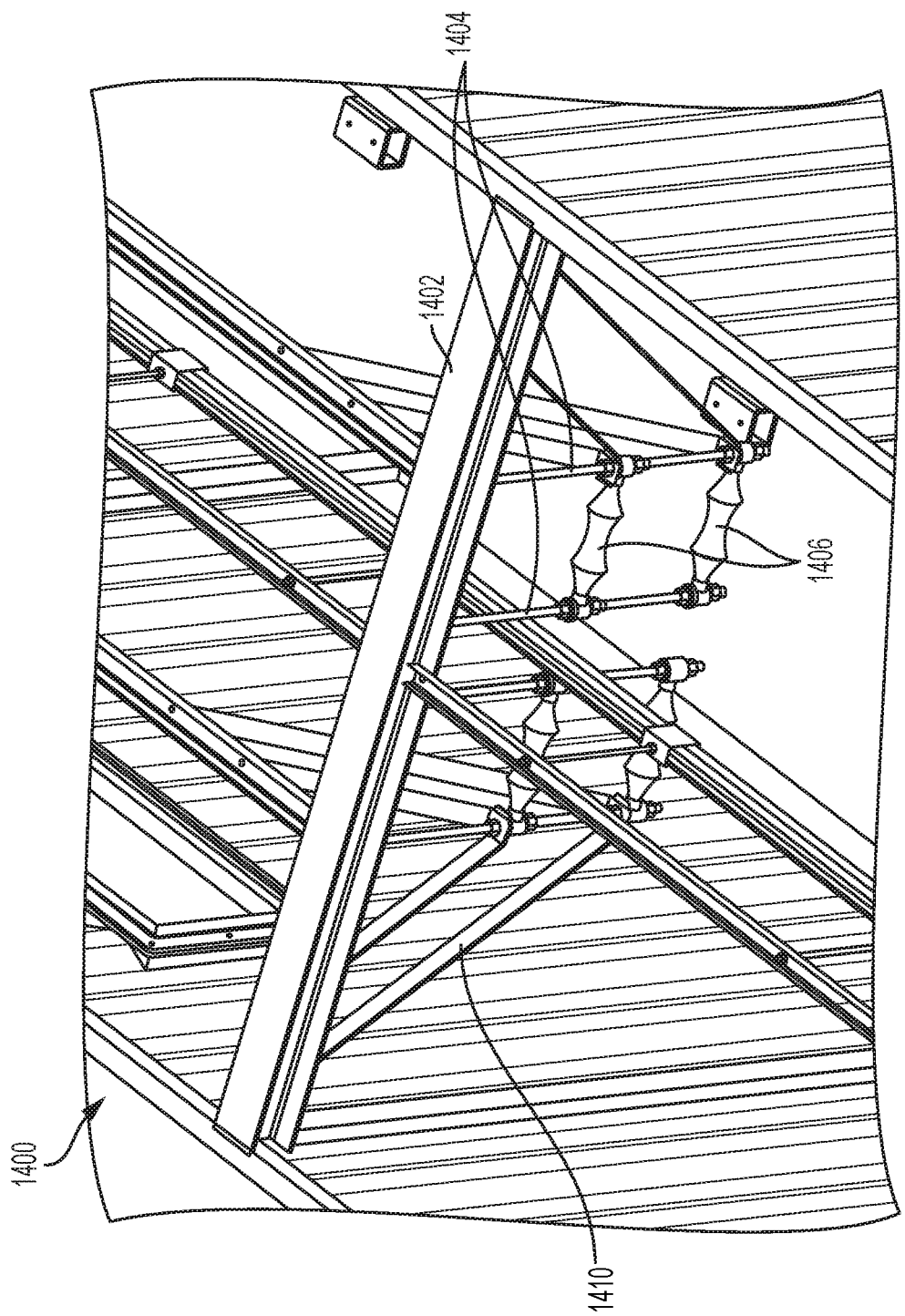
FIG. 14 is a cutaway view of the stack container of FIG. 2A-2B illustrating a main electrolyte manifold support system.

A support structure 1400 for the main electrolyte manifolds 1200 is illustrated in FIG. 14. A support beam 1402 (e.g., a 5×16 beam) can span a width of the battery stack container 1000. Support rods 1404 (e.g., ⅞ in. diameter) can be hung in pairs from the support beam 1402. Roller pipe supports 1406 can be secured to each pair of support rods 1404. In certain embodiments, a roller pipe support 1406 can be provided for each main electrolyte manifold 1200. Seismic cross-braces 1410 may be further secured to the support rods 1404 for stabilization in the event of a seismic event.

Embodiments of the battery stack container 1000 can further include a thermal management system. In general, the electrolytes can have a specific operating temperature range, typically between about 15° C. to about 40° C. If a temperature of the electrolyte goes below about 15° C., the electrolyte can freeze and, as a result, the system 200 may be unable to provide full power operation. Therefore, if the system 200 is in a cold environment, the ability to supply external heat to the electrolyte can be beneficial.

Alternatively, on hot days, this problem can be reversed. System losses can drive the electrolyte temperature over 50° C., above the upper limit of the electrolyte operating temperature range. This condition can be problematic because, when the electrolyte is at a high state of charge and a high temperature, precipitation of one or more components of the electrolyte can occur, which can result in shut down of the system 200 due to clogging. While this phenomenon is reversible, it can adversely affect availability of the system. Thus, the ability to cool of the electrolyte can be desirable.

Figure 15A:
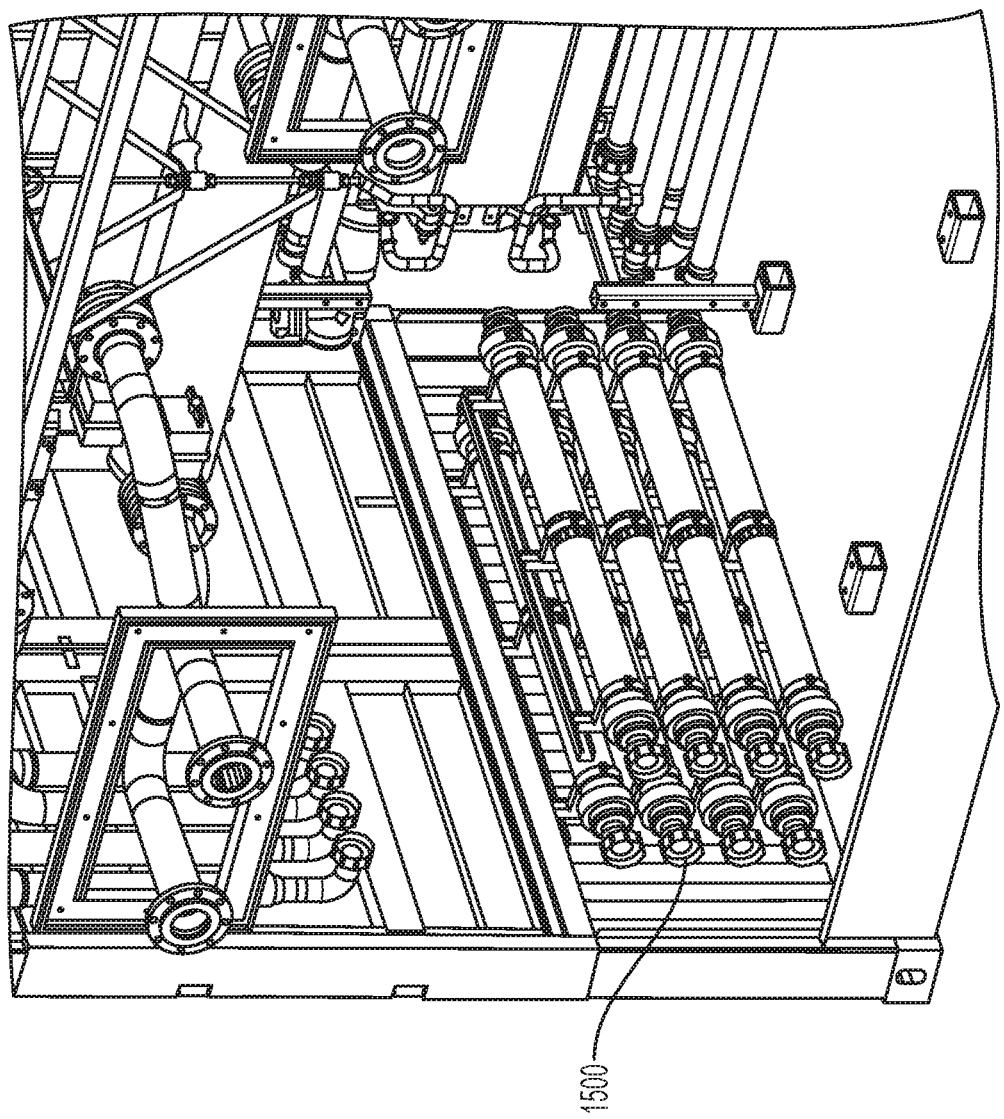
FIGS. 15A-15B illustrate embodiments of heat exchanger assemblies of the stack container of FIG. 2A-2B.
Figure 15B:
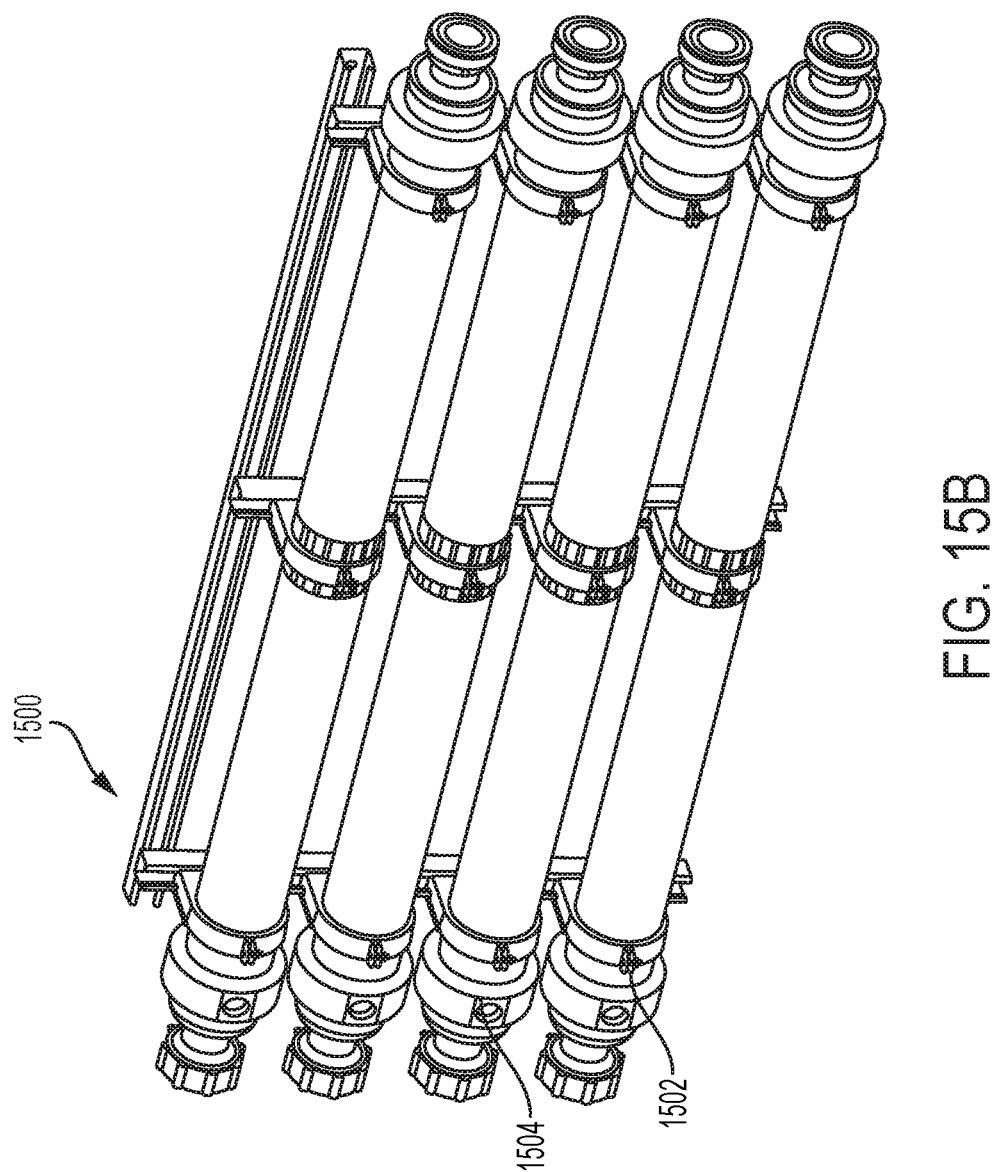

To heat and cool the electrolyte, embodiments of the battery stack container 1000 can further include liquid-to-liquid heat exchangers 1500. As illustrated in FIGS. 15A-15B, the heat exchangers 1500 can be mounted to the battery stack container 1000 using mechanical devices such as clamps 1502. In certain embodiments, the clamps 1502 can be unistrut clamps that are slip fit to accommodate thermal expansion of the heat exchangers 1500. The heat exchangers 1500 can include one or more ports 1504 for connection to a chiller-heater system (not shown). The chiller-heater system can be configured to heat or cool a heat exchange fluid (e.g., water-glycol mixture) to a predetermined temperature and deliver the heat exchange fluid to the heat exchangers 1500. The battery system controller can further aggregate requests from respective battery stacks 1100 and command the chiller-heater system as required to heat or cool the battery stacks 1100. In certain embodiments, eight heat exchangers 1500 can be configured in a parallel configuration to achieve higher capacity.

Additional systems that can be employed for operating embodiments of the battery stack container 1000 are discussed below.

Auxiliary Power

AC Auxiliary power can be connected to the battery stack containers 1000 via an AC Auxiliary Power panel (not shown). This panel can feature a main, lockable, disconnect switch and is built in accordance with industry standards (e.g., UL 508 standards). Individual circuit breakers can be provided to protect feeds to each of the two pump VFDs, fans, control panel power supply, lighting, and other local AC loads. This panel can also include line reactors (if necessary). All wiring and components except for VFDs and conduit wiring can be contained in this panel, improving servicing safety issues, as most of the AC electrical hazard is confined to the volume of the panel. This panel can be interlocked to help prevent operation when the access doors 1006 of the batter stack container 1000 are open. This panel can also supply an optional personnel environment heater.

Stack Container Controller

In an embodiment, each battery stack container 1000 can further include a stack container controller (SCC). The SCC can include a computing device capable of executing data acquisition and control programs configured to monitoring all sensors and instrumentation in the battery stack container 1000 as well as controlling the valves 1210*a*, 1210*b*, 1210*c* and motors 1209. This controller communicates with a main Battery System Controller located externally. Battery backup can be provided to allow the SCC to operate immediately following a system power outage. This allows the SCC to set valves to a save condition and to communicate the power fail state to the outside world along with other current conditions. Sensor inputs can be provided with self-test and internal calibration capability. Isolation can be provided where necessary and inputs can be protected from overcurrent and radio frequency interference (RFI). The SCC can connectors for external sensors and other connections to minimize mean time to repair (MTTR) should it fail.

Lighting, Interlocks, and Safety

LED lighting can be provided in the battery stack container for service personnel. It can also be used when security requirements dictate the monitoring of the cameras. Lighting can be controlled by switches located at each access door and also by remote command. Each door can be monitored by an interlock switch which ties into a safety interlock system. Opening a door when the system is live can take that battery stack container off line, send an alarm through the battery system controller to the monitoring network, and depending on the configuration may shut the entire modular flow battery system off.

The battery stack container can further include an independent safety system. This system can employ safety rated components such as leak sensors, interlock switches and control relays to shut down the system in the event of hazardous conditions (such as a significant leak), access interlock conditions, or certain faults. This system can be configured to operate completely independent of any software or remote over-ride command.

One skilled in the art will appreciate further features and advantages of the disclosed systems and methods based on the above-described embodiments. Accordingly, the present disclosure is not to be limited by what has been particularly shown and described, except as indicated by the appended claims. All publications and references cited herein are expressly incorporated herein by reference in their entirety.

APPENDIX I

External Systems

Embodiments of the modular flow battery system can be provided in electrical communication with one or more of the following external systems to facilitate integration with an electrical grid.

Inverter (Power Conditioning System; PCS)

The Power Conditioning System (PCS) is a bi-directional DC-AC converter between a main DC bus to an intermediate 3-phase AC voltage. The intermediate voltage is passed through an isolation transformer to provide, typically, medium Voltage, 3-phase power to the grid. The inverter DC bus is floating with respect to ground; the grid-side of the transformer is grounded or ungrounded as required.

When grid connected, the inverter acts as an AC current source, with real and reactive power being controlled (real-reactive power mode). The inverter can also be operated in stand-alone mode at the primary source of power in a micro-grid or as an uninterruptable power source (UPS), capable of supporting loads (voltage-frequency mode). By controlling AC voltage and frequency droop behavior, the inverter is also capable of being a participant in a micro-grid that includes multiple distributed generation assets as well as loads. In stand-alone mode, the inverter is the only generator, and outputs power at the required fixed voltage and frequency to support the connected loads, up to its power rating. When grid connected, the inverter can exercise full four-quadrant power control. It can provide either leading or lagging reactive power, while exporting or importing real power. As this is an energy storage system, the inverter must also import real power to charge the modular flow cell system.

Transformer, Metering, Switchgear, and Protection

In an embodiment, the isolation transformer used with the PCS may be close coupled to the PCS. This connection can have some of the highest currents in the system and consequently may have the highest cable costs. Close coupling also reduces conducted and emitted EMI from PCS switching transients, reduces losses, and provides a better characterized impedance for system modeling.

The transformer can address the following system design issues:

i. Most grid interconnects are at medium Voltage (e.g., about 13.8 kV to about 34.5 kV). Large industrial customers may interconnect at 480 Volts. The battery system DC voltage requires a PCS AC interface voltage of approximately 315 Volts and the transformer does the conversion to the required interconnect voltage.

ii. Galvanic isolation. The PCS by its nature has a galvanic connection between the DC and AC sides. If the PCS is directly connected to the grid, there can be hazardous AC voltages superimposed on the DC bus, requiring increased insulation systems and imposing additional personnel hazards.

iii. Harmonic filtering. The PCS is a PWM switch mode converter and consequently contains significant switching frequency components on the AC side. Filtering can be beneficial in the PCS to meet UL and IEEE requirements (CE in the EU) and the impedance of the transformer is a part of this filtering network design.

iv. Stability through impedance. Most PCS equipment is designed to require a certain amount of impedance between itself and the grid to maintain the stability of their internal control loops.

Metering, frequently "revenue grade," is usually installed at the Point of Common Connection (PCC) where the modular flow battery system connects to the grid. For medium voltage systems, this usually includes PTs (Potential Transformers), CTs (Current Transformers), and the meter itself. The meter is generally a network connected device (wired or wireless) such as a Shark or one manufactured by SEL. Revenue grade metering is typically specified as having 0.5% accuracy and when PTs and CTs are used these must be factored in the error calculations.

To connect a medium voltage side of the transformer to the grid, there is some form of switchgear that typically includes protection. This may be as simple as a gang-operated pole mounted disconnect with fuses but also be a recloser with very specifically set trip parameters using a complex controller such as the SEL-651R. For larger systems there may be a Medium Voltage switchboard panel with integrated metering and protection.

As utility interconnection rules typically require redundant grid protection, when a UL 1741 rated inverter is used another protective "relay" will be required. An SEL 3515 is typical of a device used for this function and is wired to shunt trip the inverter main breaker. When the inverter has not been listed under UL 1741, there will need to be two separate protective relays used and they will each need to each be hardwired to the inverter shunt trip breaker.

Auxiliary Power System

Power to operate components of the modular flow battery system such as pumps, chillers, lights etc., are supplied by the Auxiliary Power System. In an embodiment, the modular flow battery system can be designed to operate from a 480 Volts, 3-phase, 4-wire Wye supply. As this station keeping power is charged at retail rates, the grid to 480 volt transformer can be usually supplied by the local utility at their cost. The modular flow battery system includes a 480 Volt main distribution panel with breakers for each battery stack container, power conditioning system, chiller, and all other local loads requiring power.

Each individual battery stack container can be configured to operate using a 120 Amp, 480 Volt feed. Under these circumstances, maximum draw will be approximately 81 Amps with all pumps running at maximum and all loads at maximum draw. Typical operating draw will approximately 50 Amps. The electrolyte containers do not house any power devices and thus do not require any AC power. Each battery stack container can be configured to include a 480 to 120 volt transformer to supply local utility outlets for test and service equipment. Control and network equipment can include local battery power backup to allow for moving valves to safe positions and communicate state to other parts of the system.

The power requirements of the PCS can vary by manufacturer. 480 Volts 3 phase can be made available to the PCS and, if the PCS requires a lower voltage, a step-down transformer can be provided located internally or externally to the PCS for this purpose.

The chiller and heater subsystem is also powered from the auxiliary power system. Due to the heating and cooling loads, this subsystem can be a significant power draw and may have a major effect on the overall system efficiency when used.

When Black Start or extreme Low Voltage Ride-Through (LVRT) is required, Uninterruptible Power Supplies (UPS) may be employed to operate battery system pumps and control systems, the PCS auxiliary power feed, and all networking and protection equipment.

Battery System Controller (BSC)

Located external to the stack containers, in the inverter or auxiliary controls cabinet, is the battery system controller (BSC). The BSC controls operation of the modular flow battery system such that, regardless of the number of stack containers (e.g., 2, 4, 6, 8, etc.) and associated electrolyte containers, the modular flow battery system acts as a unified, single DC energy storage system to be connected to a single inverter. One BSC is associated with each inverter in a larger system containing multiple inverters. The BSC software is configured to the number of associated stack containers.

Manages startup and shutdown of all associated stack containers.

Manages and passes through notifications of warning and fault conditions.

Handles system shutdowns due to faults and interlock conditions.

Aggregates all connected stack containers to present itself and act as one system.

Calculates overall system state of charge (SOC).

Manages SOC balance in series and parallel strings.

Calculates charge and discharge current limits.

Commands the chiller-heater system.

Maintains a detailed log file of system operational and fault data.

Collects detailed log information from stack containers to be passed on through network.

Provides a web-accessible graphical user interface for local or remote monitoring and control Manages software updates to associated stack containers.

The BSC can be provided as a rack mounted, industrial temperature range computing device mounted with other system network equipment (e.g., network routers, grid controllers, etc.).

Grid Controller

The Grid Controller (GC) can be configured for the overall operation of the entire site at which the modular flow battery system is installed. For example, GC can perform one or more of the following:

Coordinates the operation of one or more BMCs, inverters, and chillers at the site.

Monitors local and/or remote power quality meters.

Manages and runs the various possible "use cases" (modes) of the entire modular flow battery system.

Records overall system performance metrics.

Communicates using DNP3, IEC 61850 and other grid compatible protocols.

Provides a web-accessible graphical user interface for local or remote monitoring and control.

Passes through management messages such as firmware updates to the inverter and BMCs.

Provides Information Security services in conjunction with a secure router.

Chiller/Heater System

The operating temperature limitations of the liquid electrolyte may benefit from the use of a chiller-heater system. Application engineering may determine the required configuration based on local site conditions and operating availability requirements.

The coolant may include any suitable coolant. For example, the coolant may include a 50-50 mix of deionized water and ethylene glycol. Inhibitors can be added to the coolant as there are metallic wetted components in both the chiller and heater. The coolant should remain non-conductive due to possible contact with energized electrolyte in the event that a liquid-to-liquid heat exchanger leak occurs.

The coolant system can include a conductivity monitor configured to trip an alarm to the monitoring system should the conductivity increase above a selected threshold (e.g., 10 microsiemens per square centimeter). As the deionized water filters in the coolant system are replaced yearly, the most likely fault indicated by coolant conductivity is a heat exchanger leak.

The chiller-heater system can be configured to operate using the site 480 V auxiliary power panel. Coolant pumping, piping, relief, bleed and isolation valves, pipe insulation, expansion tanks and system controls can be further provided as part of the chiller-heater system.

In certain embodiments, a liquid-air heat exchanger may be provided, as this is the most energy efficient cooling method for a majority of the year in temperate climates.

APPENDIX II

Operating Modes

Representative operating modes are illustrated below. Specifics operating modes can be determined by customer requirements and integration with PV, wind or load control systems are possible.

1. Grid Connected Operating Mode

One of the primary operating modes of the modular flow battery system is grid-connected. This operating mode allows the client to perform VAR support, demand management, and load leveling. All of these applications are achieved while continuously connected and synchronized to the utility grid. The modular flow battery system is assumed to be a minor player (power-wise) on the grid.

1a. Renewables Firming

Energy storage output can be actively controlled to ramp up/down based on varying solar PV or wind generation, to keep the combined power output level constant over a specified period of time as well as manage renewable ramp rates.

1b. Demand Charge Management

Energy storage will operate in concert with varying customer load to limit demand to a preset level. The customer load will be monitored and the storage unit dispatched to make up the difference between actual load and preset limit. The system may be set to pre-defined values or set to learn demand curves over time.

1c. Load Following \

Energy storage can be dispatched to follow the variations in the combined output power of the renewables source and the distribution circuit load. This can be used to manage renewable economics such as in Demand Charge Management above or to deal with distribution limits.

1d. Time-of-Use Energy Cost Management (Arbitrage)

An optimal energy storage dispatch schedule can be developed based on a time-of-use tariff. The schedule can include both charge and discharge. In certain embodiments, this may be practical only where there is a significant difference in energy costs between peak and off-peak or where negative pricing occurs due to a "duck curve."

1e. Voltage Support

The inverter can be dispatched to inject reactive power into the distribution circuit based on scenarios including time based control, manual dispatch, and real-time active monitoring.

2. Microgrid Operating Mode

A microgrid is a network of distributed generators and loads where the modular flow battery system can be one of several power sources that can be commanded to import power for charging, or export power to support loads. In order to participate fully in a microgrid, the inverter is configured to implement AC frequency and voltage droop controls. Dynamic set points are adjusted by a system operator (microgrid controller) to tune the modular flow battery system role in the microgrid.

3. Standalone Operating Mode

In the standalone operating mode, the modular flow battery system can be operated as a standalone generator for powering known loads. In this mode, the modular flow battery system is only connected to the load, and can only discharge, as there is no other power source to charge from. Typically, this mode occurs when configured for backup power (below), otherwise there would be no way to recharge the modular flow cell battery system.

4. Backup Power (Standalone)

The inverter can be optionally equipped with an islanding recloser. With this configuration the modular flow battery system can provide dynamic backup power to the load. In a grid fault condition, the recloser opens to disconnect from the grid, and power continues to flow to the customer loads from the modular flow battery system. This is not to be confused with uninterruptible power supply, as there will be a transition where the modular flow battery system has to adjust to the sudden change in load.

When grid power is restored, the PCS synchronizes its voltage and phase prior to re-closing the grid recloser. This is usually handled by the recloser control relay in conjunction with special inverter capabilities. This capability could be combined with any of the above load leveling and demand management applications.

5. Black Start

If sufficient UPS capability is installed at the site, one or more modular flow battery systems may be configured for black start operation. Once one modular flow battery system is brought online, other associated systems could then be brought up using the power output from the first system. Thus an entire large system may be brought online. The grid load should be within the capability of the system and this requires site and application specific engineering.

APPENDIX III

Emergency Power Off (EPO)/Emergency Stop (ESTOP)

Best practices and safety regulations require the modular flow battery system to be isolated or shutdown in an emergency or other abnormal event. The different levels of shutdown are listed below which can be configured based on the customer requirements or authority having jurisdiction (AHJ) regulations. The system life is extended by minimizing the number of "hard shutdowns," so effort should be made to match the shutdown/isolation level with the severity of the abnormal event/emergency.

The table below indicates which systems are de-energized/disabled at each level of shutdown. A description of each state, what actions occur, and what physically triggers each state follows.

|  | Control Signal | | | | | |
| --- | --- | --- | --- | --- | --- | --- |
|  | Grid EPO | System EPO | ESTOP | Emerg./ OFF | Local ESTOP | Local Off |
| AC Grid Contactor | X | X | X | X | | |
| Battery Container | | All | All | All | Pair | Indi- |

-continued

| | Control Signal | | | | |
|---|---|---|---|---|---|
| | Grid EPO | System EPO | ESTOP | Emerg./ OFF | Local ESTOP | Local Off |
| DC Contactor | | | | | | vidual |
| Pump Shutdown | | | All | All | Individual | Individual |
| UPS EPO (when used) | | | All | All | Individual | |

1. Grid EPO
    Description: Grid Power export enable signal removed. PCS is isolated from the grid.
    Action: Opens AC output contactors in PCS. DC Bus active and pumps running. System will perform an orderly shutdown.
    Physical: Dry contact relay for remote client use. It will be jumpered if not used.
2. System EPO—System-Wide Power EPO
    Description: PCS is issued EPO, AC grid contactors open, all Battery Container DC bus contactors open. Battery Containers are running on auxiliary power with zero DC load.
    Action: DC Bus Enable signal removed from battery containers. AC contactors Enable signal removed. 208 VAC auxiliary power remains. Orderly shutdown is initiated. All pumps remain active.
    Physical: Separate hard-wired signal (parallel with E-stop) with input from control software.
3. ESTOP—System-Wide ESTOP
    Description: All AC and DC high voltage power is isolated, only controls active.
    Action: Remove Enable signal to all battery containers and PCS. Opens AC output contactors in PCS and opens all DC Bus contactors. All Pumps stop. All UPS units issued EPO.
    Physical: 1 guarded mushroom push-button on PCS enclosure, 1 software relay, 1 Dry contact relay for remote client use, 1 guarded mushroom push-button at each Battery Container. All push-buttons are N/C, all relays are N/O.
4. Emergency/OFF Switch
    Description: Complete system shutdown.
    Action: Turns off 480V auxiliary power to all Battery Containers and PCS. EPOs all UPS units. All contactors open and power converters turn off. No power except for network device battery power.
    Physical: One guarded main disconnect switch at main auxiliary power panel.
5. LOCAL ESTOP—Battery Module ESTOP
    Description: Shuts down operation of a specific Battery Container. PCS and all other Battery Containers are still operating normally. Associated, paired Battery Container goes to standby idle condition.
    Action: Opens DC Bus contactors. All Pumps stop.
    Physical: Activated by push-button on Battery Container enclosure, or by opening the Battery Container DC disconnect switch (via AUX contact).
6. Local OFF Switch
    Description: Shuts off local individual Battery Container operation.
    Action: Battery Container Controller loses power. Opens the DC Bus contactors. All Pumps stop.
    Physical: Activated by switch on Battery Container enclosure. Note: If UPS is installed, UPS must be shut down.

What is claimed is:

1. A modular secondary battery, comprising:
    a battery system including:
        a housing containing a plurality of flow cell stacks in electrical communication;
        an anolyte conduit network in fluid communication with each of the plurality of flow cell stacks and including a plurality (N) of respective pairs of anolyte conduits, each of the respective pairs of anolyte conduits including an anolyte return conduit and an anolyte supply conduit;
        a catholyte conduit network in fluid communication with each of the plurality of flow cell stacks and including a plurality (N) of respective pairs of catholyte conduits, each of the respective pairs of catholyte conduits including a catholyte return conduit and a catholyte supply conduit;
        wherein the N pairs of anolyte conduits and the N pairs of catholyte conduits extend through sides of the housing; and are spaced along the sides of the housing; and
        between 1 and N respective pairs of anolyte containers and catholyte containers each of the pairs respectively configured to contain an anolyte solution and a catholyte solution and each individual anolyte container contained within a respective electrolyte container and each individual catholyte contained within a respective electrolyte container, wherein each anolyte container is configured to independently couple to a respective one of the pairs of anolyte conduits and each catholyte container is configured to independently couple to a respective one of the pairs of catholyte conduits such that the respective anolyte containers and the respective catholyte containers within the respective electrolyte containers are spaced along the sides of the housing; and
        wherein the N pairs of anolyte conduits and the N pairs of catholyte conduits extending through and spaced along the sides of the housing facilitate varying an amount of anolyte solution and catholyte solution and a capacity of electrical energy that can be stored and discharged in accordance with a coupling and use of N or fewer pairs of anolyte containers and catholyte containers with the battery system.

2. The battery of claim 1, wherein each battery systems is configured to be vertically stacked with respect to another battery system and each electrolyte container is configured to be vertically stacked with respect to another electrolyte container, the battery system and electrolyte containers in each horizontal layer of a stack providing a respective modular secondary battery where the pairs of anolyte containers and catholyte containers of one modular secondary battery are isolated from the pairs of anolyte containers and catholyte containers of each other modular secondary battery.

3. The battery of claim 2, further comprising at least two vertically stacked battery system, at least two vertically stacked anolyte containers, and at least two vertically stacked catholyte containers to provide at least two modular secondary batteries.

4. The battery of claim 1, wherein the battery system is generally elongated and extends along a longitudinal axis, and wherein respective anolyte container and catholyte containers are configured to couple to the battery stack container along sides lateral to the longitudinal axis and wherein N is one of 2, 3, 4 and 5.

5. The battery of claim 1, wherein each of the N pairs of anolyte conduits is positioned on a first lateral side of the container stack and each of the N pairs of catholyte conduits is positioned on a second lateral side of the container stack that opposes the first lateral side of the container stack.

6. A method for providing variable energy storage and power output, comprising:
- selecting between 1 and a plurality (N) pairs of electrolyte containers to provide a predetermined capacity of electrical energy, each pair of electrolyte containers including an anolyte container configured to hold an anolyte solution and a catholyte container configured to hold a catholyte solution;
- selecting a number of flow cell batteries in a battery system to provide a predetermined amount of power, wherein the battery system comprises:
  - a housing containing at least the number of flow cell batteries in electrical communication;
  - an anolyte conduit network in fluid communication with each of the at least the number of flow cell stacks and including a plurality (N) of respective pairs of anolyte conduits, each of the respective pairs of anolyte conduits including an anolyte return conduit and an anolyte supply conduit; and
  - a catholyte conduit network in fluid communication with each of the at least the number of flow cell stacks and including a plurality (N) of respective pairs of catholyte conduits, each of the respective pairs of catholyte conduits including a catholyte return conduit and a catholyte supply conduit;
  - wherein the N pairs of anolyte conduits and the N pairs of catholyte conduits extend through sides of the housing to facilitate coupling; and are spaced along the sides of the housing; and
- coupling each of the between 1 and N pairs of electrolyte containers directly to the battery system such that each respective anolyte container is independently coupled to one of the respective pairs of anolyte conduits and each respective catholyte container is independently coupled to one of the pairs of respective pairs of catholyte conduits to create a flow battery system including the predetermined capacity of electrical energy and the predetermined amount of power; and
- wherein the respective anolyte containers and the respective catholyte containers are spaced along the sides of the battery system in a single horizontal plane.

7. The method of claim 6, wherein each anolyte container is configured to reversibly couple with an anolyte return and anolyte supply conduit pair, and each catholyte container is configured to reversibly couple with a catholyte return and catholyte supply conduit pair.

8. The method of claim 6, wherein the between 1 and N pairs of electrolyte containers are coupled to the battery system such that the anolyte containers are coupled on one side of the battery system and the catholyte containers are coupled on another, opposed side of the system.

9. The method of claim 6, wherein the battery system defines a first battery stack and the between 1 and N pairs of electrolyte containers define first pairs of electrolyte containers that, when coupled to the first battery system, define a first modular secondary battery in a first horizontal plane; and
wherein the method comprises:
- selecting a second between 1 and N pairs of electrolyte containers for coupling to a battery system defining a second battery stack, together when coupled, the second pairs of electrolyte containers and second battery stack defining a second modular secondary battery in a second horizontal plane; and
- stacking the first modular secondary battery and second modular secondary battery.

10. The method of claim 9, wherein the between 1 and N pairs of electrolyte containers from the first modular secondary battery and the second modular secondary battery are arranged such that the anolyte containers of the first modular secondary battery are vertically stacked with the anolyte containers of the second modular secondary battery and the catholyte containers of the first modular secondary battery are vertically stacked with the catholyte containers of the second modular secondary battery, and wherein the battery system of the first modular secondary battery is vertically stacked with the battery system of the second modular secondary battery.

11. The method of claim 6, wherein in a lower portion the housing of the battery system there is defined a volume to receive at least some leaking anolyte solution or catholyte solution or both that leaks from any of the pairs of electrolyte containers thereby to provide shared containment of electrolyte.

12. The method of claim 11, further comprising coupling a respective containment sleeve around each coupling between the battery system and the respective pairs of electrolyte containers to direct solution for shared containment by the battery system.

13. The method of claim 11, wherein the battery system comprises an access door through the housing located above the lower portion of the housing that provides the secondary containment.

14. The method of claim 13, wherein the access door is located on an end in line with a longitudinal axis of the battery system.

15. The method of claim 6, further comprising detecting a leak in an electrolyte container of one of the N pairs of electrolyte containers using a leak sensor system within the electrolyte container, the leak sensor system being disposed between a container wall and a tank configured to contain an electrolyte, and the leak sensor system comprising a sump, a sensor configured to detect an electrolyte, and a fitting configured to provide fluid communication between the sump and the sensor.

16. The method of claim 15, further comprising:
- filling an interstitial space between the container wall and the tank with a low conductivity liquid, wherein the low conductivity liquid is miscible with an electrolyte that leaks from the tank to form an electrolyte mixture, the low conductivity liquid provided in a sufficient volume such that the electrolyte mixture fills the sump and contacts the sensor; and
- detecting the electrolyte leak based upon a conductivity of the electrolyte mixture in contact with the sensor.

17. The battery of claim 1, wherein in a lower portion the housing there is defined a volume to receive leaking electrolyte from any of the pairs of electrolyte containers thereby to provide shared containment of electrolyte by the battery system.

18. The battery of claim 17, wherein the housing is sealed in the lower portion to define the volume by a bottom pan.

19. The battery of claim 17 comprising a respective containment sleeve around each coupling between the battery system and the between 1 and N respective pairs of electrolyte containers to direct leaked solution to the battery system for shared containment.

20. The battery of claim 17, wherein the battery system comprises an access door through the housing located above the lower portion of the housing where the volume is defined to provide secondary containment.

21. The battery of claim 20, wherein the access door is located on an end in line with a longitudinal axis of the battery system.

22. A battery system for a modular secondary battery, comprising:
- a housing containing a plurality of flow cell stacks in electrical communication;
- an anolyte conduit network in fluid communication with each of the plurality of flow cell stacks and including a plurality (N) of respective pairs of anolyte conduits, each of the respective pairs of anolyte conduits including an anolyte return conduit and an anolyte supply conduit; and
- a catholyte conduit network in fluid communication with each of the plurality of flow cell stacks and including a plurality (N) of respective pairs of catholyte conduits, each of the respective pairs of catholyte conduits including a catholyte return conduit and a catholyte supply conduit;
- wherein the N pairs of anolyte conduits and the N pairs of catholyte conduits:
  - extend through sides of the housing; and
  - are spaced along the sides of the housing; and
  - are configured to independently couple to respective ones of between 1 and N respective pairs of an anolyte container and a catholyte container, each anolyte container configured to contain an anolyte solution and each catholyte container configured to contain a catholyte solution and each anolyte container and each catholyte contained within a respective electrolyte container, such that the respective pairs of an anolyte containers and a catholyte container are spaced along the sides of the housing; and
- wherein the battery system facilitates varying an amount of anolyte solution and catholyte solution and a capacity of electrical energy that can be stored and discharged in accordance with a coupling and use of between 1 and N pairs of an anolyte container and a catholyte container with the battery system.

* * * * *

UNITED STATES PATENT AND TRADEMARK OFFICE
CERTIFICATE OF CORRECTION

PATENT NO. : 11,165,086 B2
APPLICATION NO. : 15/845849
DATED : November 2, 2021
INVENTOR(S) : Modderno et al.

Page 1 of 1

It is certified that error appears in the above-identified patent and that said Letters Patent is hereby corrected as shown below:

On the Title Page

Item [60], second line: "62/463,388," should be "62/436,388,"

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*